(12) United States Patent (10) Patent No.: US 8,467,374 B2
Takano (45) Date of Patent: Jun. 18, 2013

(54) COMMUNICATION DEVICE, COMMUNICATION METHOD AND COMMUNICATION SYSTEM

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 798 days.

(21) Appl. No.: 12/705,110

(22) Filed: Feb. 12, 2010

(65) Prior Publication Data

US 2010/0208633 A1 Aug. 19, 2010

(30) Foreign Application Priority Data

Feb. 19, 2009 (JP) ................ P2009-036295

(51) Int. Cl.
*H04J 3/06* (2006.01)
*H04B 1/40* (2006.01)

(52) U.S. Cl.
USPC .......................... 370/350; 455/76

(58) Field of Classification Search
USPC ......................................... 370/350
See application file for complete search history.

(56) References Cited

U.S. PATENT DOCUMENTS

| | | | | |
|---|---|---|---|---|
| 7,373,176 B2* | 5/2008 | Chotkowski et al. | ...... | 455/562.1 |
| 8,005,437 B2* | 8/2011 | Rofougaran | ...... | 455/76 |
| 8,315,657 B2* | 11/2012 | van Rensburg et al. | ...... | 455/509 |
| 8,364,096 B2* | 1/2013 | Oota et al. | ...... | 455/103 |
| 8,379,592 B2* | 2/2013 | van Rensburg et al. | ...... | 370/330 |
| 2005/0070331 A1* | 3/2005 | Higuchi et al. | ...... | 455/562.1 |

FOREIGN PATENT DOCUMENTS

JP 2008-252240 10/2008

* cited by examiner

*Primary Examiner* — Guang Li
(74) *Attorney, Agent, or Firm* — Sherr & Jiang, PLLC

(57) ABSTRACT

There is provided a communication device including a first communicating unit, a second communicating unit that has a plurality of antennas, a first communication processing unit that processes a signal received by the first communicating unit, allows the first communicating unit to transmit a signal, and a second communication processing unit that processes a signal received by the second communicating unit, allows the second communicating unit to transmit a signal. The second communication processing unit includes an adjusting unit that adjusts a signal to be transmitted from each of the plurality of antennas based on an adjustment factor, a transmission beam pattern candidate setting unit that derives at least one transmission beam pattern based on a first transmission request and a second transmission request, and a beam pattern applying unit that applies any of the set at least one transmission beam pattern candidate based on first requested-beam-pattern identification information.

8 Claims, 10 Drawing Sheets

COMMUNICATION DEVICE, COMMUNICATION METHOD AND COMMUNICATION SYSTEM

BACKGROUND OF THE INVENTION

1. Field of the Invention

The present invention relates to a communication device, a communication method and a communication system.

2. Description of the Related Art

Recently, a variety of devices such as a computer such as a notebook personal computer (PC) and a television receiver become multifunctional more and more, and a device having a function of wireless communication with another device has been widely used. Herein, the wireless communication between the above-described devices is performed by using a carrier wave (electromagnetic wave) having a predetermined frequency of 5 GHz and the like, for example.

On the other hand, technology to make a communication speed of the wireless communication higher by using a higher frequency carrier wave referred to as a millimeter wave is recently developed. Herein, the millimeter wave means the carrier wave of which wavelength is 10 mm to 1 mm and frequency is 30 GHz to 300 GHz, for example. Therefore, when using the millimeter wave such as the carrier wave of 60 GHz in the communication, for example, channel allocation in units of GHz is possible, so that the communication speed may be made higher than when using the carrier wave of 5 GHz in the communication.

In general, the millimeter wave such as the carrier wave of 60 GHz has characteristics in which straightness is stronger and attenuation associated with reflection is larger than those of the carrier wave of 5 GHz. Therefore, the communication using the millimeter wave such as the carrier wave of 60 GHz is performed by using mainly a direct wave and a reflected wave with about one reflection. Further, the millimeter such as the carrier wave of 60 GHz has characteristics in which free-space propagation loss is larger than that of the carrier wave of 5 GHz. Therefore, in general, the communication using the millimeter wave has a communication distance shorter than that of the communication using the carrier wave of 5 GHz.

In such a circumstance, technology to perform the communication by allowing the carrier wave to have the directionality is developed. There is Japanese Patent Application Laid-Open No. 2008-252240, for example, as the technology to switch the directionality of an antenna based on a communication target and a type of transmitted data.

SUMMARY OF THE INVENTION

Related technology for performing the communication by allowing the carrier wave to have the directionality (hereinafter, referred to as the "related technology") switches the directionality of the antenna based on the communication target and the type of transmitted data. Herein, when using the millimeter wave such as the carrier wave (electromagnetic wave) of 60 GHz in the communication, for example, this is performed by using mainly the direct wave and the reflected wave with about one reflection due to the straightness stronger than that of the carrier wave of 5 GHz as described above. Therefore, when applying the related technology to the communication using the millimeter wave such as the carrier wave of 60 GHz, when the directionality of the antenna in the communication device on a transmission side (hereinafter, also referred to as a "transmitting device") for transmitting the signal is toward the communication device on a reception side being a communication target (hereinafter, also referred to as a "receiving device"), there is a possibility that the communication is normally established.

However, in the above-described case, when the directionality of the antenna in the transmitting device for transmitting the signal is not toward the receiving device being the communication target, the signal is not propagated to the receiving device, so that the communication is not established. That is to say, when using the related technology, the communication is not established unless the directionality of the antenna in the transmitting device is toward the receiving device being the communication target. Therefore, when applying the related technology to the communication using the millimeter wave such as the carrier wave of 60 GHz, for example, it is possible that it takes a long time until the transmitting device and the receiving device being the communication target may communicate with each other.

Further, the communication device realizes the directionality of the antenna by including a plurality of antennas, for example. Herein, when the communication device includes a plurality of antennas, variation in characteristics due to fabrication and change in temperature might arise, for example, in a circuit (analog circuit) related to the transmission and reception corresponding to each antenna. Therefore, when performing the communication by utilizing the directionality of the antenna, it is difficult that the communication device realizes a desired directionality of the antenna unless the variation of each antenna is evened out. However, the related technology merely simply switches the directionality of the antenna based on the communication target and the type of the transmitted data, and an issue related to the variation is not considered at all. Therefore, when using the related technology, the communication is not always established normally between the transmitting device and the receiving device even when the directionality of the antenna in the transmitting device is toward the receiving device being the communication target.

Therefore, it is out of the question to expect stabilized communication in the communication device using the related technology (hereinafter, referred to as a "related communication device").

In light of the foregoing, it is desirable to provide a novel and improved communication device, communication method and communication system capable of stabilizing the communication in the communication utilizing the directionality of the antenna.

According to an embodiment of the present invention, there is provided a communication device including a first communicating unit that performs wireless communication with an external device on a first carrier wave at a first frequency, a second communicating unit that has a plurality of antennas, and that performs the wireless communication with the external device on a second carrier wave at a second frequency, wherein a directionality of the second carrier wave is stronger than a directionality of the first carrier, and wherein the second carrier wave causes a larger propagation loss than the first carrier wave causes, a first communication processing unit that processes a signal received by the first communicating unit, and that allows the first communicating unit to transmit a signal, and a second communication processing unit that processes a signal received by the second communicating unit, and that allows the second communicating unit to transmit a signal. The second communication processing unit may include an adjusting unit that adjusts a signal to be transmitted from each of the plurality of antennas based on an adjustment factor for the each of the plurality of antennas, the adjustment factor derived by a loop back transfer function among the plurality of antennas, a transmission beam pattern candidate setting unit that derives at least one transmission beam pattern for defining a beam directionality of the signal to be transmitted based on a first transmission request received by the first communicating unit and a second transmission request received by the second communicating unit, and that sets the derived at least one transmission beam pattern as at least one transmission beam pattern candidate to be applied to the signal to be transmitted, and a beam pattern applying unit that applies any of the set at least one transmission beam pattern candidate based on first requested-beam-pattern identification information transferred from the first communication processing unit, the first requested-beam-pattern identification information specifying a beam pattern of which transmission is requested by the external device.

According to such a configuration, the communication may be stabilized in the communication utilizing the directionality of the antenna.

And also, the transmission beam pattern candidate setting unit may include a synchronizing unit that locates a starting position of the second transmission request based on packet positional information transferred from the first communication processing unit, the packet positional information indicating a position of a predetermined packet included in the first transmission request, a transfer function deriving unit that derives a transfer function based on the second transmission request whose starting position is located by the synchronizing unit, and a transmission beam pattern candidate storing unit that derives the transmission beam pattern based on the transfer function derived by the transfer function deriving unit, and in which the derived transmission beam pattern is stored as the transmission beam pattern candidate.

And also, the second communicating unit may receive the second transmission request, one packet of which nominates a plurality of transmission beam patterns. The second communication processing unit may further include a reception strength deriving unit that derives a reception strength for each of the nominated plurality of transmission beam patterns based on the second transmission request whose starting position is located by the synchronizing unit, a requested-beam-pattern determining unit that determines, out of the plurality of transmission beam patterns nominated in the packet of the second transmission request, a beam pattern to request the external device to transmit data in, based on a derivation result from the reception strength deriving unit, the second transmission request having been transmitted from the external device, and a processing unit that allows, via the first communication processing unit, second requested-beam-pattern identification information to be transmitted to the external device, which transmits the second transmission request, the second requested-beam-pattern identification information indicating the beam pattern determined by the requested-beam-pattern determining unit.

And also, the second requested-beam-pattern identification information may be a number indicating the beam pattern determined by the requested-beam-pattern determining unit.

And also, the second communication processing unit may further include a processing unit that allows the second communicating unit to transmit a third transmission request, one packet of which nominates one or more transmission beam pattern candidates stored in the transmission beam pattern candidate storing unit.

And also, the adjusting unit may include an adjustment reference signal generating unit that generates an adjustment reference signal for a reference for deriving the loop back transfer function, a transfer function deriving unit that derives the loop back transfer function for each of the plurality of antennas based on a reception result acquired by transmitting the adjustment reference signal from the each of the plurality of antennas and receiving the transmitted adjustment reference signal at another of the plurality of antennas, an adjustment factor deriving unit that derives the adjustment factor based on the loop back transfer function derived by the transfer function deriving unit, and a multiplying unit that multiplies the signal to be transmitted by the adjustment factor.

According to another embodiment of the present invention, there is provided a communication method including the step of transmitting, at a transmitting device, synchronously a first transmission request using a first carrier wave at a first frequency and a second transmission request using a second carrier wave at a second frequency, one packet of the second transmission request nominating a plurality of transmission beam patterns for defining a beam directionality of the signal to be transmitted, wherein a directionality of the second carrier wave is stronger than a directionality of the first carrier, and wherein the second carrier wave causes a larger propagation loss than the first carrier wave causes, locating, by a receiving device, a starting position of the second transmission request, based on a position of a predetermined packet included in the first transmission request, determining, at the receiving device, out of the plurality of transmission beam patterns nominated in the packet of the second transmission request, a beam pattern to request the transmitting device to transmit a data in, transmitting, at the receiving device, requested-beam-pattern identification information indicating the determined beam pattern to request, determining, at the transmitting device, a beam pattern for use in transmitting the data on the second carrier wave, based on the requested-beam-pattern identification information, and transmitting, at the transmitting device, the data on the second carrier wave, to which the determined beam pattern for use in transmitting the data is applied.

By use of such a method, the communication may be stabilized in the communication utilizing the directionality of the antenna.

According to another embodiment of the present invention, there is provided a communication system including a plurality of communication devices, each of which is capable of transmitting a signal and receiving a signal transmitted from an external device. Each of the communication devices may include a first communicating unit that performs wireless communication with an external device on a first carrier wave at a first frequency, a second communicating unit that has a plurality of antennas, and that performs the wireless communication with the external device on a second carrier wave at a second frequency, wherein a directionality of the second carrier wave is stronger than a directionality of the first carrier, and wherein the second carrier wave causes a larger propagation loss than the first carrier wave causes, a first communication processing unit that processes a signal received by the first communicating unit, and that allows the first communicating unit to transmit a signal, and a second communication processing unit that processes a signal received by the second communicating unit, and that allows the second communicating unit to transmit a signal. The second communication processing unit may include an adjusting unit that adjusts a signal to be transmitted from each of the plurality of antennas based on an adjustment factor for the each of the plurality of antennas, the adjustment factor derived by a loop back transfer function among the plurality of antennas, a transmission beam pattern candidate setting unit that derives at least one transmission beam pattern for defining a beam directionality of the signal to be transmitted based on a first transmission request received by the first communicating unit and a second transmission request received by the second communicating unit, and that sets the derived at least one transmission beam pattern as at least one transmission beam pattern candidate to be applied to the signal to be transmitted, and a beam pattern applying unit that applies any of the set at least one transmission beam pattern candidate based on first requested-beam-pattern identification information transferred from the first communication processing unit, the first requested-beam-pattern identification information specifying a beam pattern of which transmission is requested by the external device.

According to such a configuration, the communication may be stabilized in the communication utilizing the directionality of the antenna.

According to an embodiment of the present invention, the communication may be stabilized in the communication utilizing the directionality of the antenna.

DETAILED DESCRIPTION OF THE EMBODIMENTS

Figure 1:
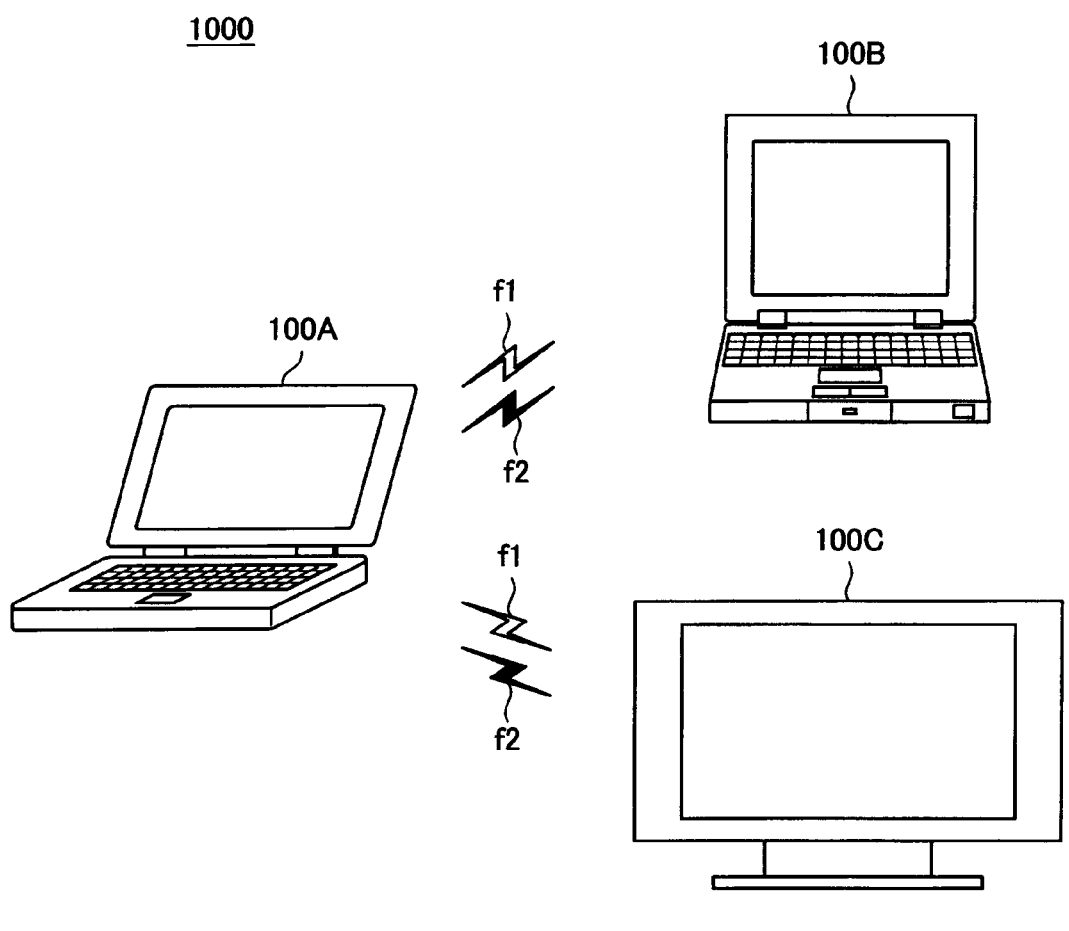
FIG. 1 is an illustration diagram showing an example of a communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, it is hereinafter described in a following order.

1. Approach according to Embodiment of the Present Invention

2. Communication Device according to Embodiment of the Present Invention (Approach According to Embodiment of the Present Invention)

Before describing a configuration of a communication device according to an embodiment of the present invention, a communication stabilization approach according to the embodiment of the present invention is described.

[Assumption]

FIG. 1 is an illustration diagram showing an example of a communication system 1000 according to the embodiment of the present invention. Herein, FIG. 1 shows an example in which the communication system 1000 has communication devices 100A, 100B, 100C and the like, and communication is performed between the communication devices 100A and 100B and between the communication devices 100A and 100C. Although the example in which the communication devices 100A and 100B are notebook PCs and the communication device 100C is a television receiver is shown in FIG. 1, the communication device according to the embodiment of the present invention is not limited to the notebook PC and the television receiver. Hereinafter, there is a case in which the communication devices 100A, 100B, 100C and the like according to the embodiment of the present invention are referred to as the "communication device 100" as a generic name.

The communication device 100 communicates with an external device by using two carrier waves, which are a carrier wave f1 having a first frequency and a carrier wave f2 having a second frequency with a stronger directionality and a larger propagation loss than those of the carrier wave f1 having the first frequency. Herein, although there is a carrier wave having a frequency of 5 GHz widely used in data communication such as a wireless local area network (LAN), for example, as the carrier wave having the first frequency according to the embodiment of the present invention, this is not limited to the above description. Although there is a millimeter wave (or a quasi-millimeter wave), for example, as the carrier wave having the second frequency according to the embodiment of the present invention, this is not limited to the above description.

Hereinafter, a case in which the communication device 100 uses the carrier wave of 5 GHz as the carrier wave f1 having the first frequency and uses the carrier wave of 60 GHz as the carrier wave f2 having the second frequency is described as an example. That is to say, hereinafter, a case in which the communication using the carrier wave f2 having the second frequency is faster than the communication using the carrier wave f1 having the first frequency is described as an example. Meanwhile, the communication stabilization approach according to the embodiment of the present invention described below may also be applied to a case in which the communication using the carrier wave f2 having the second frequency is not faster than the communication using the carrier wave f1 having the first frequency, for example.

[Overview of Communication Stabilization Approach]

The carrier wave f2 of 60 GHz (carrier wave having the second frequency) used by the communication device 100 in the communication has the stronger directionality and the larger propagation loss than those of the carrier wave f1 of 5 GHz (carrier wave having the first frequency). Therefore, when using the carrier wave f2 having the second frequency in the communication, there is an advantage that the communication faster than that using the carrier wave f1 having the first frequency may be realized; however, there is a disadvantage that a communication distance is shorter than that of the communication using the carrier wave f1 having the first frequency.

Then, the communication device 100 transmits the carrier wave f2 having the second frequency by utilizing a directionality of an antenna. The carrier wave f2 having the second frequency may be transmitted to a specific direction by transmitting the carrier wave f2 having the second frequency by utilizing the directionality of the antenna, so that the communication device 100 may increase the communication distance of the communication using the carrier wave f2 having the second frequency.

Herein, the communication device 100 according to the embodiment of the present invention is provided with a plurality of antennas, for example, and increases the communication distance of the communication using the carrier wave f2 having the second frequency by creating a beam-like directionality. This is because it is more effective to use a direct wave than to use a reflected wave for stabilizing the communication due to characteristics that straightness is stronger when the frequency of the carrier wave f2 having the second frequency is 60 GHz, for example. Hereinafter, a beam-like directionality pattern according to the embodiment of the present invention is referred to as a "beam pattern".

Although there is a method of creating a beam by an array antenna such as a method of determining weight according to uniform distribution and a method of determining the weight according to Taylor distribution, for example, as a method of creating the directionality utilizing a plurality of antennas, this is not limited to the above description.

When transmitting the carrier wave f2 having the second frequency by utilizing the directionality of the antenna, issues related to the above-described related technology (issue that time is taken when establishing the communication/issue related to realization of a desired directionality) might occur. Then, the communication device 100 according to the embodiment of the present invention stabilizes the communication in the communication utilizing the directionality of the antenna by following processes (1) to (3), for example.

(1) Calibration of a Plurality of Antennas Related to Transmission and Reception of Carrier Wave f2 having Second Frequency As described above, when the communication device is provided with a plurality of antennas, variation in characteristics due to fabrication, change in temperature and the like might arise, for example, in a circuit (analog circuit) related to the transmission and reception corresponding to each antenna. It is difficult to realize the directionality of the antenna desired by the communication device in a state in which the variation is present, and the state is not desirable when stabilizing the communication. Then, the communication device 100 performs calibration of a plurality of antennas related to the transmission and reception of the carrier wave f2 having the second frequency in order to even out the variation.

Herein, the variation in the circuit related to the transmission and reception corresponding to each of the antennas may be observed as variation in transfer function of each circuit, for example. Therefore, in the communication device 100 according to the embodiment of the present invention, the calibration is realized by conforming the transfer functions of the circuits each corresponding to each of the antennas to one another.

Hereinafter, the calibration according to the embodiment of the present invention is described. Meanwhile, although a case in which the communication device 100 is provided with three antennas as a plurality of antennas related to the transmission and reception of the carrier wave f2 having the second frequency is described as an example for simplifying the description, it goes without saying that the number of antennas according to the embodiment of the present invention is not limited to three. Hereinafter, each antenna is also referred to as a "branch".

[1-1] Overview of Calibration According to Embodiment of the Present Invention

[A] First Method

When the communication device 100 is provided with three antennas, which are antennas 0, 1 and 2 (antennas related to the transmission and reception of the carrier wave f2), a transfer function Tx(i) related to the transmission and a transfer function Rx(i) related to the reception in each antenna are represented as follows. Herein, i indicates the number attributed to each antenna.

Transfer function related to transmission: Tx(0), Tx(1) and Tx(2)

Transfer function related to reception: Rx(0), Rx(1) and Rx(2)

In order to realize the desired beam pattern in the above-described case, it is necessary to acquire transmission adjustment factors (K_T(0), K_T(1) and K_T(2)) satisfying an equation 1 and reception adjustment factors (K_R(0), K_R(1) and K_R(2)) satisfying an equation 2, for example.

$$Tx(0)\cdot K\_T(0)=Tx(1)\cdot K\_T(1)=Tx(2)\cdot K\_T(2) \quad \text{(equation 1)}$$

$$Rx(0)\cdot K\_R(0)=Rx(1)\cdot K\_R(1)=Rx(2)\cdot K\_R(2) \quad \text{(equation 2)}$$

Each adjustment factor (calibration factor) satisfying the equations 1 and 2 may be acquired by installing an adjustment device for transmitting a reference adjustment signal on a certain position (for example, a position sufficiently far from the communication device 100) to transmit and receive the reference adjustment signal, for example. Further, the communication device 100 may realize the calibration by using each adjustment factor acquired as described above as a weighting factor for a transmitted signal and a received signal. Therefore, by using the calibration according to the first method, the communication device 100 may acquire a directionality pattern as designed in advance in the transmission and reception, so that this may realize the desired beam pattern. Herein, the calibration according to the first method is also referred to as perfect calibration.

[B] Second Method

By using the first method, each communication device 100 composing the communication system 1000 may perform the calibration of a plurality of antennas related to the transmission and reception of the carrier wave f2 having the second frequency. However, when using the first method, there is a disadvantage that there is restriction in the communication system 1000; for example, the adjustment device should be installed. Then, a second method of the calibration according to the embodiment of the present invention is described next.

In the communication device 100 using the second method, the calibration is realized by acquiring an adjustment factor K(i) satisfying an equation 3, for example, and by multiplying the adjustment factor K(i) by the transmitted signal by a digital signal process, for example. As described above, by performing the signal process using the acquired adjustment factor K(i), for example, the communication device 100 may compensate the transfer function of the circuit (analog circuit) corresponding to each antenna. That is to say, the calibration according to the second method is realized by acquiring the adjustment factor K(i) with which a ratio of the transfer function Tx(i) related to the transmission and the transfer function Rx(i) related to the reception is constant even when the branch is changed. Herein, the calibration according to the second method is also referred to as partial calibration.

$$\{Tx(0)/Rx(0)\}\cdot K(0)=\{Tx(1)/Rx(1)\}\cdot K(1)=\{Tx(2)/Rx(2)\}\cdot K(2) \quad \text{(equation 3)}$$

By using the calibration according to the second method (partial calibration), the communication device 100 may conform the directionality pattern related to the transmission to the directionality pattern related to the reception. Therefore, when using the second method, the communication device 100 may realize the directionality the same as that in the reception also in the transmission by applying the directionality pattern created from the received signal to the transmitted signal, for example. That is to say, the communication device 100 using the calibration according to the second method (partial calibration) may make the directionality pattern of the transmission and the directionality pattern of the reception identical. Therefore, the communication device 100 may realize the desired beam pattern by using the calibration according to the second method.

Herein, the calibration according to the second method (partial calibration) is easier than the calibration according to the first method (perfect calibration) to realize, and there is not the restriction in the communication system 1000 as in the first method.

As described above, the communication device 100 according to the embodiment of the present invention may realize the calibration of a plurality of antennas related to the transmission and reception of the carrier wave f2 having the second frequency by the first and second methods, for example.

Meanwhile, as described above, the calibration according to the second method is easier to realize than the calibration according to the first method, and there is not the restriction in the communication system 1000 as in the first method. Therefore, it is hereinafter described supposing that the communication device 100 according to the embodiment of the present invention performs the calibration according to the second method.

[1-2] Process Related to Calibration

As a process related to the calibration in the communication device 100 according to the embodiment of the present invention, a derivation process of the adjustment factors each corresponding to each of a plurality of antennas related to the transmission and reception of the carrier wave f2 having the second frequency included in the communication device 100 is more specifically described.

Figure 2:
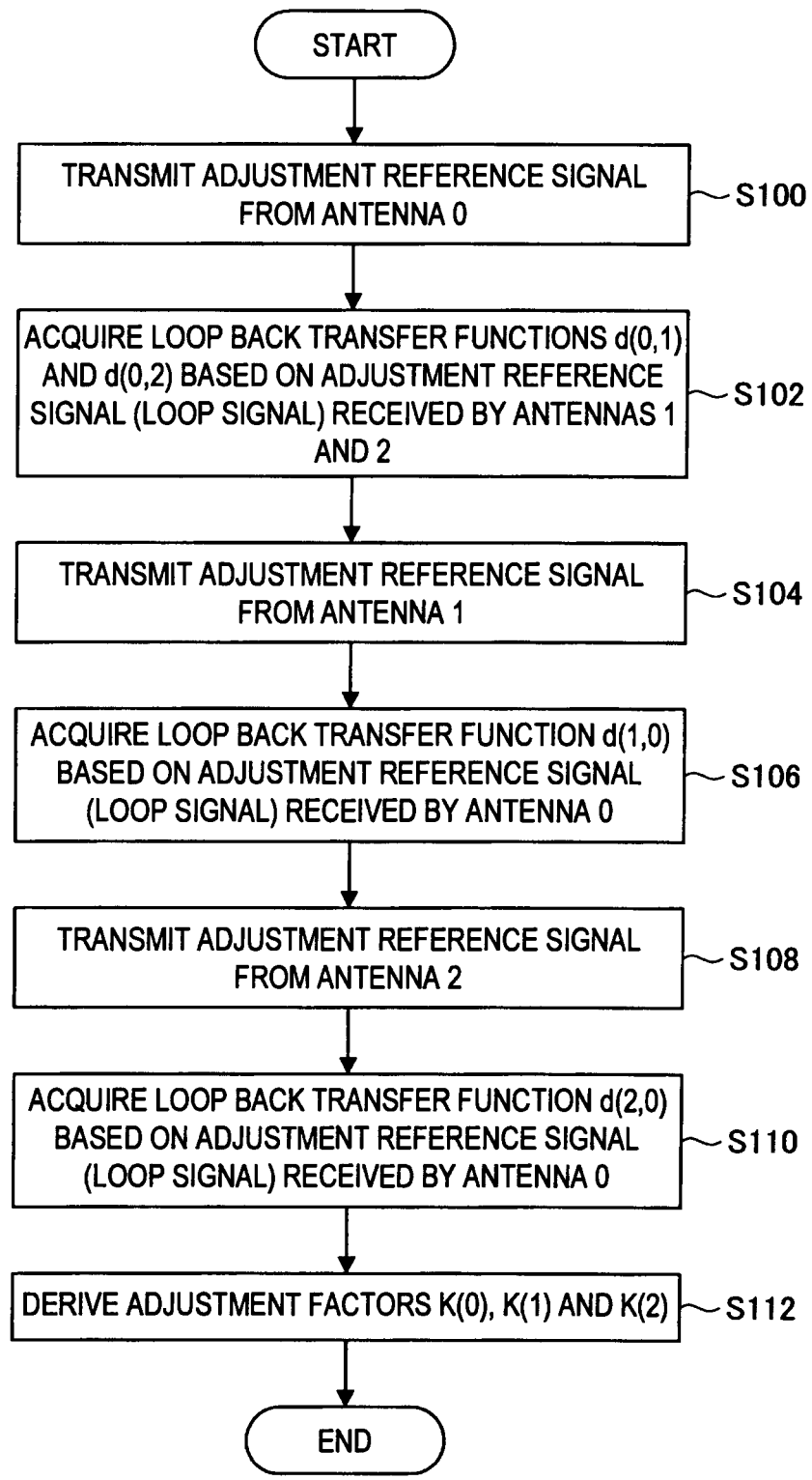
FIG. 2 is a flowchart for illustrating a process related to calibration in a communication device according to the embodiment of the present invention.

FIG. 2 is a flowchart for illustrating a process related to the calibration in the communication device 100 according to the embodiment of the present invention. Herein, FIG. 2 shows an example of the derivation process of the adjustment factor when the communication device 100 performs the calibration according to the second embodiment (partial calibration). Further, in FIG. 2, the process of a case in which the communication device 100 is provided with the three antennas, which are the antennas 0, 1 and 2, as a plurality of antennas related to the transmission and reception of the carrier wave f2 for simplifying the description.

The communication device 100 transmits an adjustment reference signal from the antenna 0 (S100). Herein, the adjustment reference signal according to the embodiment of the present invention is the signal, which is used as a reference for derivation of a loop back transfer function between a plurality of antennas.

The communication device 100 acquires loop back transfer functions d (0, 1) and d (0, 2) based on the adjustment reference signal (loop signal) received by each of the antennas 1 and 2 as a result of the process at the step S100 (S102). Although the communication device 100 may set a reception result acquired by receiving the adjustment reference signal output from one antenna by another antenna (that is to say, the loop signal) as the loop back transfer function, this is not limited to the above description.

Herein, the loop back transfer functions d (0, 1) and d (0, 2) acquired at the step S102 are represented by equations 4 and 5, respectively.

$$d(0,1)=Tx(0)\cdot Rx(1) \quad \text{(equation 4)}$$

$$d(0,2)=Tx(0)\cdot Rx(2) \quad \text{(equation 5)}$$

When the loop back transfer functions d (0, 1) and d (0, 2) are acquired at the step S102, the communication device 100 transmits the adjustment reference signal from the antenna 1 (S104).

The communication device 100 acquires the loop back transfer function d (1, 0) based on the adjustment reference signal (loop signal) received by the antenna 0 as a result of the process at the step S104 (S106). Herein, the loop back transfer function d (1, 0) acquired at the step S106 is represented by an equation 6.

$$d(1,0)=Tx(1)\cdot Rx(0) \quad \text{(equation 6)}$$

When the loop back transfer function d (1, 0) is acquired at the step S106, the communication device 100 transmits the adjustment reference signal from the antenna 2 (S108).

The communication device 100 acquires the loop back transfer function d (2, 0) based on the adjustment reference signal (loop signal) received by the antenna 0 as a result of the process at the step S108 (S110). Herein, the loop back transfer function d (2, 0) acquired at the step S110 is represented by an equation 7.

$$d(2,0)=Tx(2)\cdot Rx(0) \quad \text{(equation 7)}$$

When the loop back transfer functions d (0, 1), d (0, 2), d (1, 0) and d (2, 0) are acquired at the steps S102, S106 and S110, the communication device 100 derives the adjustment factors K (0), K (1) and K (2) each corresponding to each antenna (S112). The communication device 100 may derive the adjustment factors K (1) and K (2) by equations 8 and 9, respectively, for example, when the antenna 0 is used as the reference (for example, when K (0)=1). Meanwhile, it goes without saying that the communication device 100 according to the embodiment of the present invention is not limited to derive the adjustment factor using the antenna 0 as the reference, and the adjustment factor K (0) of the antenna 0, which is used as the reference, is not limited to be set as K (0)=1.

$$K(1)=d(0,1)/d(1,0)=\{Rx(1)/Tx(1)\}\cdot\{Tx(0)/Rx(0)\} \quad \text{(equation 8)}$$

$$K(2)=d(0,2)/d(2,0)=\{Rx(2)/Tx(2)\}\cdot\{Tx(0)/Rx(0)\} \quad \text{(equation 9)}$$

Herein, calibration results of the antenna 0, the antenna 1 and the antenna 2 are represented by equations 10, 11 and 12, respectively, based on the equations 3, 8 and 9 and K(0)=1.

$$\{Tx(0)/Rx(0)\}\cdot K(0)=Tx(0)/Rx(0) \quad \text{(equation 10)}$$

$$\{Tx(1)/Rx(1)\}\cdot K(1)=Tx(0)/Rx(0) \quad \text{(equation 11)}$$

$$\{Tx(2)/Rx(2)\}\cdot K(2)=Tx(0)/Rx(0) \quad \text{(equation 12)}$$

Therefore, the communication device 100 may derive the adjustment factors each corresponding to each of a plurality of antennas related to the transmission and reception of the carrier wave f2 by performing the process shown in FIG. 2, for example. Further, the communication device 100 may realize the calibration according to the second method (partial calibration) by compensating the transmitted signal by the adjustment factor derived by the process in FIG. 2, for example.

(2) Acquisition Process of Transmitted Beam Pattern

By performing the process (1), the communication device 100 may realize the desired beam pattern. On the other hand, even when the communication device 100 on a transmission side (hereinafter, also referred to as a "transmitting device") transmits the signal to which the beam pattern is applied in the communication system 1000, this is not always received normally by the communication device 100 on a reception side (hereinafter, also referred to as a "receiving device").

Then the communication device 100 according to the embodiment of the present invention stores a transmission beam pattern candidate, which is a candidate of the beam pattern to be applied to the transmitted signal (hereinafter, referred to as a "transmission beam pattern"). When the communication device 100 serves as the transmitting device, any stored transmission beam pattern candidate is selectively applied to the transmitted signal (for example, signal corresponding to transmitted data) based on a result of communication with the receiving device later.

Hereinafter, a transmission beam pattern acquisition process for storing the transmission beam pattern candidate in the communication device 100 according to the embodiment of the present invention is described. Meanwhile, a process related to the application of the transmission beam pattern in the communication device 100 is described in (3) to be described.

[2-1] Overview of Transmission Beam Pattern Acquisition Process

The communication device 100 derives the transmission beam pattern candidate to store based on the reception result of the signal for acquiring the transmission beam pattern transmitted from another communication device 100 composing the communication system 1000 by the carrier wave f2 of 60 GHz (carrier wave having the second frequency).

Herein, for example, when another communication device 100 (corresponding to the transmitting device) transmits the signal by the carrier wave f2 of 60 GHz, the signal received by the communication device 100 (corresponding to the receiving device) is small, so that there is a case in which packet synchronization may not be performed. In the above-described case, it is possible that the communication device 100 (corresponding to the receiving device) is not able to specify when another communication device 100 (corresponding to the transmitting device) transmits the signal for acquiring the transmission beam pattern. Therefore, in the above-described case, it is possible that the communication device 100 (corresponding to the receiving device) is not able to derive the transmission beam pattern candidate based on the reception result of the signal transmitted by the carrier wave f2 of 60 FHz.

Then, in the communication system 1000, the transmitting device synchronizes the signal by the carrier wave f1 of 5 GHz (carrier wave having the first frequency) with the signal by the carrier wave f2 of 60 GHz (carrier wave having the second frequency) to transmit. Herein, the synchronized transmission means to conform a start position of a predetermined packet of the signal by the carrier wave f1 of 5 GHz to a start position of a predetermined packet of the signal by the carrier wave f2 of 60 GHz to transmit, for example.

The receiving device specifies the start position of the signal by the carrier wave f2 of 60 GHz based on a position of the predetermined packet included in the signal by the carrier wave f1 of 5 GHz (more specifically, packet positional information to be described later). Then, the receiving device derives the transmission beam pattern candidate based on the specified signal by the carrier wave f2 of 60 GHz.

Herein, although there is a request to send (RTS) packet of 5 GHz (hereinafter, also referred to as a "first transmission request"), for example, as the signal by the carrier wave f1 of 5 GHz transmitted by the transmitting device in the transmission beam pattern acquisition process, this is not limited to the above description. Further, although there is the RTS packet of 60 GHz (hereinafter, also referred to as a "second transmission request"), for example, as the signal by the carrier wave f2 of 60 GHz transmitted by the transmitting device in the transmission beam pattern acquisition process, this is not limited to the above description. Hereinafter, it is described supposing that the communication device 100 (corresponding to the receiving device) performs the transmission beam pattern acquisition process based on the first and second transmission requests transmitted from another communication device 100 (corresponding to the transmitting device).

Figure 3:
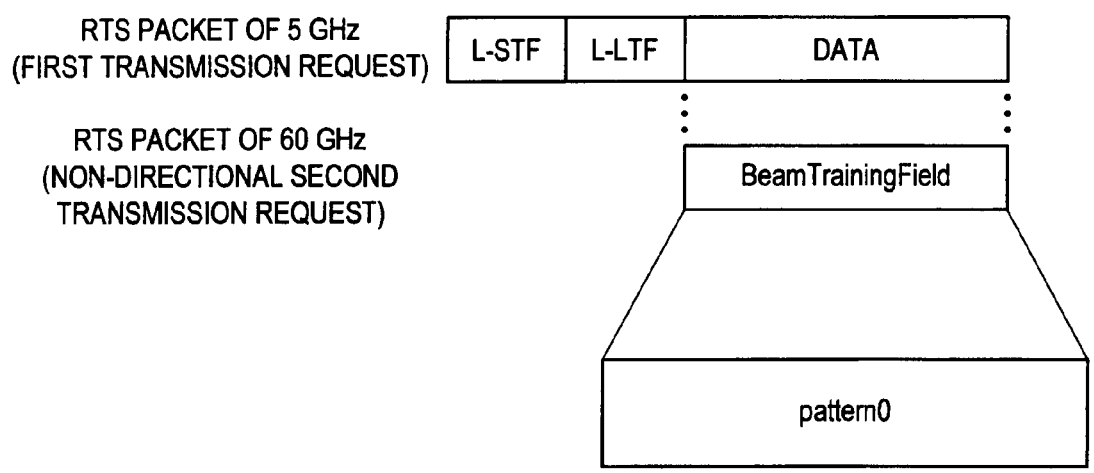
FIG. 3 is an illustration diagram showing an example of first and second transmission requests related to a transmission beam pattern acquisition process in the embodiment of the present invention.

FIG. 3 is an illustration diagram showing an example of the first and second transmission requests related to the transmission beam pattern acquisition process according to the embodiment of the present invention.

As shown in FIG. 3, the transmitting device conforms a start position of a DATA portion of the RTS packet of 5 GHz to a start position of BeamTrainingField of a non-directional RTS packet of 60 GHz to transmit each RTS packet. Therefore, the receiving device may specify the start position of the RTS packet of 60 GHz (second transmission request) based on the reception result of the RTS packet of 5 GHz (first transmission request). Meanwhile, although an example in which an end position of the DATA portion of the RTS packet of 5 GHz and the start position of the BeamTrainingField of the RTS packet of 60 GHz conform to each other is shown in FIG. 3, this is not limited to the above description.

[2-2] Acquisition Process of Transmission Beam Pattern

Next, the acquisition process of the transmission beam pattern according to the embodiment of the present invention is more specifically described. Hereinafter, an example of the transmission beam pattern acquisition process in one communication device 100 composing the communication system 1000 is described. Meanwhile, another communication device 100 composing the communication system 1000 may also derive and store the transmission beam pattern candidate by performing the process similar to that of the above-described one communication device 100, so that the description thereof is omitted.

Figure 4:
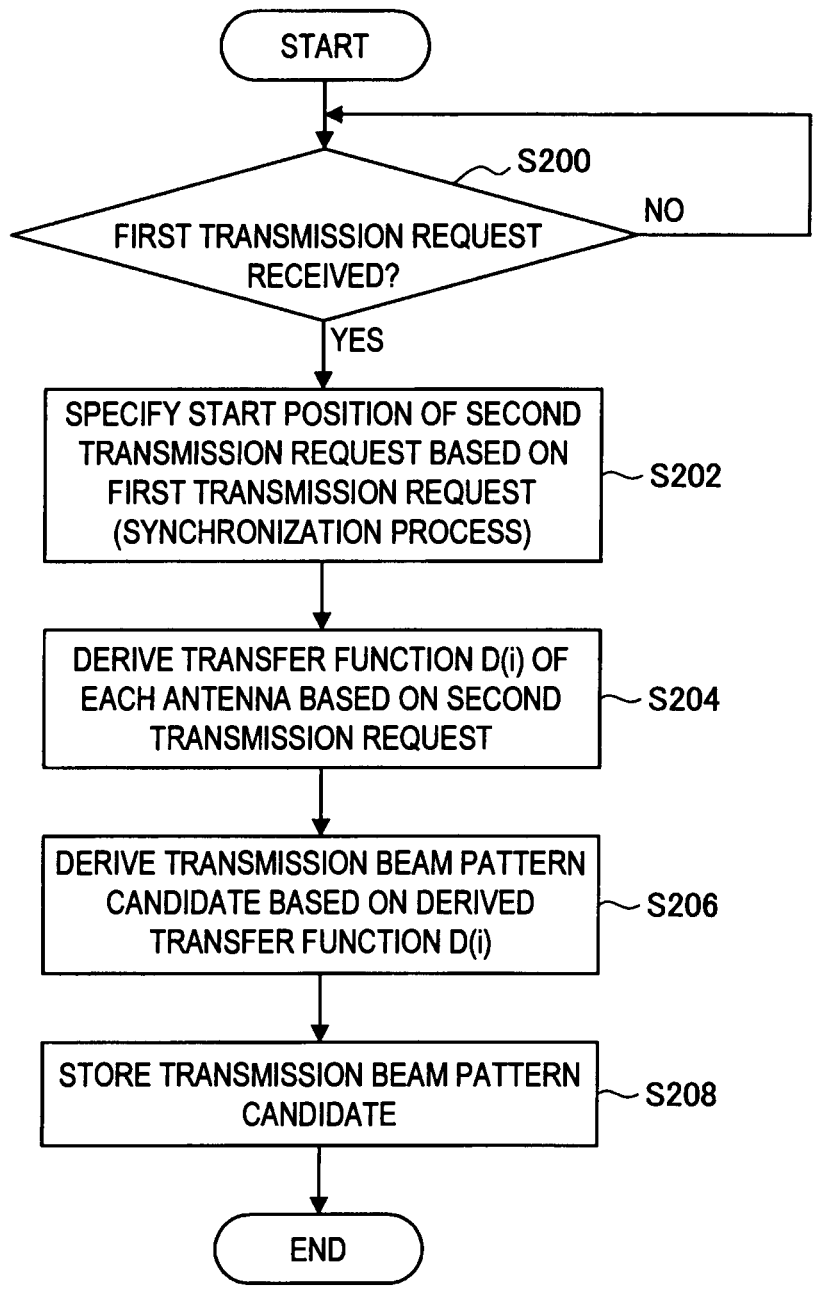
FIG. 4 is a flowchart showing an example of the acquisition process of the transmission beam pattern according the embodiment of the present invention.

FIG. 4 is a flowchart showing an example of the acquisition process of the transmission beam pattern according to the embodiment of the present invention.

The communication device 100 judges whether the first transmission request is received (S200). Herein, the communication device 100 performs the judgment at the step S200 based on whether an L-STF portion and an L-LTF portion of the RTS packet of 5 GHz shown in FIG. 3 are detected, for example.

When it is not judged that the first transmission request is received at the step S200, the communication device 100 does not proceed with the process until this is judged to be received.

When it is judged that the first transmission request is received at the step S200, the communication device 100 specifies the start position of the second transmission request based on the first transmission request (S202; synchronization process). Herein, the communication device 100 specifies the start position of the second transmission request (start position of BeamTrainingField) based on the start position of the DATA portion of the RTS packet of 5 GHz shown in FIG. 3, for example.

The communication device 100 derives a transfer function D(i) of each antenna related the transmission and reception of the carrier wave f2 having the second frequency based on the second transmission request specified at the step S202 (S204). Herein, although the transfer function D(i) is acquired by transmission of a known signal by the transmitting device (another communication device 100) and division of the signal received by each antenna by the known signal by the receiving device (communication device 100), for example, this is not limited to the above description.

When the transfer function D(i) of each antenna related to the transmission and reception of the carrier wave f2 having the second frequency is derived at the step S204, the communication device 100 derives the transmission beam pattern candidate based on the derived transfer function D(i) (S206).

EXAMPLE OF METHOD OF DERIVING TRANSMISSION BEAM PATTERN CANDIDATE

When the communication device 100 is provided with the three antennas (antennas related to the transmission and reception of the carrier wave f2), which are the antennas 0, 1 and 2, the transfer function D is represented by an equation 13. Herein, "T" in the equation 13 represents transposition.

$$D=[D(0),D(1),D(2)]^T \quad \text{(equation 13)}$$

The communication device 100 derives the transmission beam pattern candidate by taking conjugate of the transfer function D represented by the equation 13 as represented by an equation 14. Herein, the communication device 100 according to the embodiment of the present invention sets the conjugate of the transfer function D as the transmission beam pattern candidate because it is possible to use the conjugate of the transfer function as weight for reception of a maximum ratio combining. Further, "*" in the equation 14 represents the conjugate.

$$\text{transmission beam pattern candidate}= [D(0)^*,D(1)^*,D(2)^*]^T \quad \text{(equation 14)}$$

The communication device 100 may derive the transmission beam pattern candidate based on the transfer function D(i) of each antenna related to the transmission and reception of the carrier wave f2 having the second frequency, which is derived, by calculating the equations 13 and 14, for example. Meanwhile, it goes without saying that the method of deriving the transmission beam pattern candidate according to the embodiment of the present invention is not limited to the above description.

When the transmission beam pattern candidate is derived at the step S206, the communication device 100 stores the derived transmission beam pattern candidate (S208). Herein, although the communication device 100 associates the derived transmission beam pattern candidate with an identification number (for example, an index number) for identifying the transmission beam pattern candidate to store, this is not limited to the above description.

The communication device 100 may acquire the transmission beam pattern candidate related to the communication with another communication device 100 composing the communication system 1000 by performing the process shown in FIG. 4, for example.

Further, the communication device 100 may perform the process shown in FIG. 4 a plurality of times at different times between the same and each of other communication devices 100 composing the communication system 1000, for example, thereby storing a plurality of transmission beam pattern candidates each corresponding to each of other communication devices 100.

Herein, a plurality of transmission beam pattern candidates stored in the communication device 100 as described above includes the transmission beam pattern of when an obstacle such as a human obstructs a communication path and the transmission beam pattern of when the obstacle does not obstruct the communication path, for example. Therefore, the communication device 100 may acquire (store) the candidate of the transmission beam pattern suitable for the communication in a variety of situations by performing the process shown in FIG. 4 a plurality of times at different times, for example.

(3) Communication Process

[3-1] Overview of Communication Process

In each communication device 100 composing the communication system 1000, each communication device 100 stores the transmission beam pattern candidate by performing the process (2). Then, in the communication system 1000, the transmitting device selectively applies any stored transmission beam pattern candidate to the signal transmitted by the carrier wave f2 having the second frequency based on the communication result between the same and the receiving device, which is a communication target, and transmits the signal to the receiving device.

More specifically, the transmitting device transmits the signal in which a plurality of transmission beam patterns are set in one packet by the carrier wave f2 of 60 GHz (carrier wave having the second frequency), for example. At that time, the transmitting device synchronizes the signal by the carrier wave f1 of 5 GHz (carrier wave having the first frequency) with the signal by the carrier wave f2 of 60 GHz to transmit as in the process (2).

Herein, as the signal by the carrier wave f1 of 5 GHz transmitted by the transmitting device in the communication process, although there is the RTS packet of 5 GHz (first transmission request), for example, this not limited to the above description. Further, as the signal by the carrier wave f2 of 60 GHz transmitted by the transmitting device in the communication process, although there is the RTS packet of 60 GHz (second transmission request), for example, this not limited to the above description. Hereinafter, a case in which the transmitting device synchronizes the first and second transmission requests to transmit is described as an example.

Figure 5:
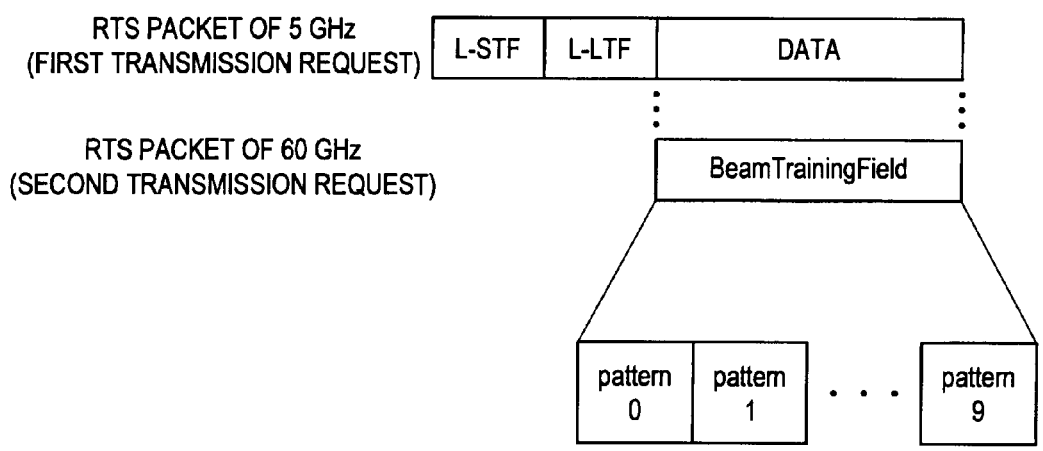
FIG. 5 is an illustration diagram showing an example of first and second transmission requests related to a communication process in the embodiment of the present invention.

FIG. 5 is an illustration diagram showing an example of the first and second transmission requests related to the communication process in the embodiment of the present invention.

As shown in FIG. 5, the transmitting device conforms the start position of the DATA portion of the RTS packet of 5 GHz to the start position of BeamTrainingField of the RTS packet of 60 GHz to transmit each RTS packet. Therefore, the receiving device may specify the start position of the RTS packet of 60 GHz (second transmission request) based on the reception result of the RTS packet of 5 GHz (first transmission request). Meanwhile, although an example in which the end position of the DATA portion of the RTS packet of 5 GHz and the start position of the BeamTrainingField of the RTS packet of 60 GHz conform to each other is shown in FIG. 5, this is not limited to the above description.

Further, the transmitting device sets a plurality of transmission beam patterns in the BeamTrainingField of the RTS packet of 60 GHz and transmits the RTS packet of 60 GHz. Herein, although a case in which the transmitting device sets 10 types of transmission beam patterns in the BeamTraining-Field of the RTS packet of 60 GHz is shown in FIG. 5, this is not limited to the above description.

The receiving device specifies the start position of the signal by the carrier wave f2 of 60 GHz based on the position of the predetermined packet included in the signal by the carrier wave f1 of 5 GHz as in the case of the process (2) (acquisition process of transmission beam pattern). Then, the receiving device determines the beam pattern of which transmission is requested to the transmitting device (hereinafter, referred to as a "requested beam pattern") out of a plurality of transmission beam patterns set in the RTS packet of 60 GHz based on the specified signal by the carrier wave f2 of 60 GHz.

Herein, the receiving device determines the transmission beam pattern having the largest received power out of a plurality of transmission beam patterns set in the RTS packet of 60 GHz as the requested beam pattern, for example, this is not limited to the above description.

When the requested beam pattern is determined, the receiving device transmits the determined requested beam pattern to the transmitting device by the signal by the carrier wave f1 of 5 GHz, for example. Herein, although there is a clear to send (CTS) packet (reception preparation completion notice) of 5 GHz, for example, as the signal by the carrier wave f1 of 5 GHz transmitted by the receiving device in the communication process, this is not limited to the above description.

Although the receiving device may transmit the requested beam pattern itself by the CTS packet of 5 GHz, this is not limited to the above description. For example, the receiving device may transmit information indicating the requested beam pattern (hereinafter, referred to as "requested beam pattern identification information") such as the identification number indicating the requested beam pattern by the CTS packet of 5 GHz. By the transmission of the requested beam pattern identification information from the receiving device, the communication system 1000 may reduce a data amount related to the transmission of the requested beam pattern to prevent throughput from lowering. Hereinafter, it is described supposing that each of the communication devices 100 composing the communication system 1000 transmits the requested beam pattern identification information when this serves as the receiving device.

The transmitting device, which receives the requested beam pattern identification information, selects one transmission beam pattern candidate out of the stored transmission beam pattern candidates based on the received requested beam pattern identification information, and determines the same as the transmission beam pattern. Then, the transmitting device applies the determined transmission beam pattern to the signal to be transmitted by the carrier wave f2 having the second frequency, and transmits the signal to the receiving device.

Therefore, the transmitting device may transmit the signal by the carrier wave f2 of 60 GHz (carrier wave having the second frequency) by applying the transmission beam pattern of which transmission is requested by the receiving device. Therefore, in the communication system 1000, the communication using the carrier wave f2 of 60 GHz (carrier wave having the second frequency) between one communication device 100 acting as the transmitting device and another communication device 100 acting as the receiving device is stably performed.

[3-2] Communication Process

Figure 6:
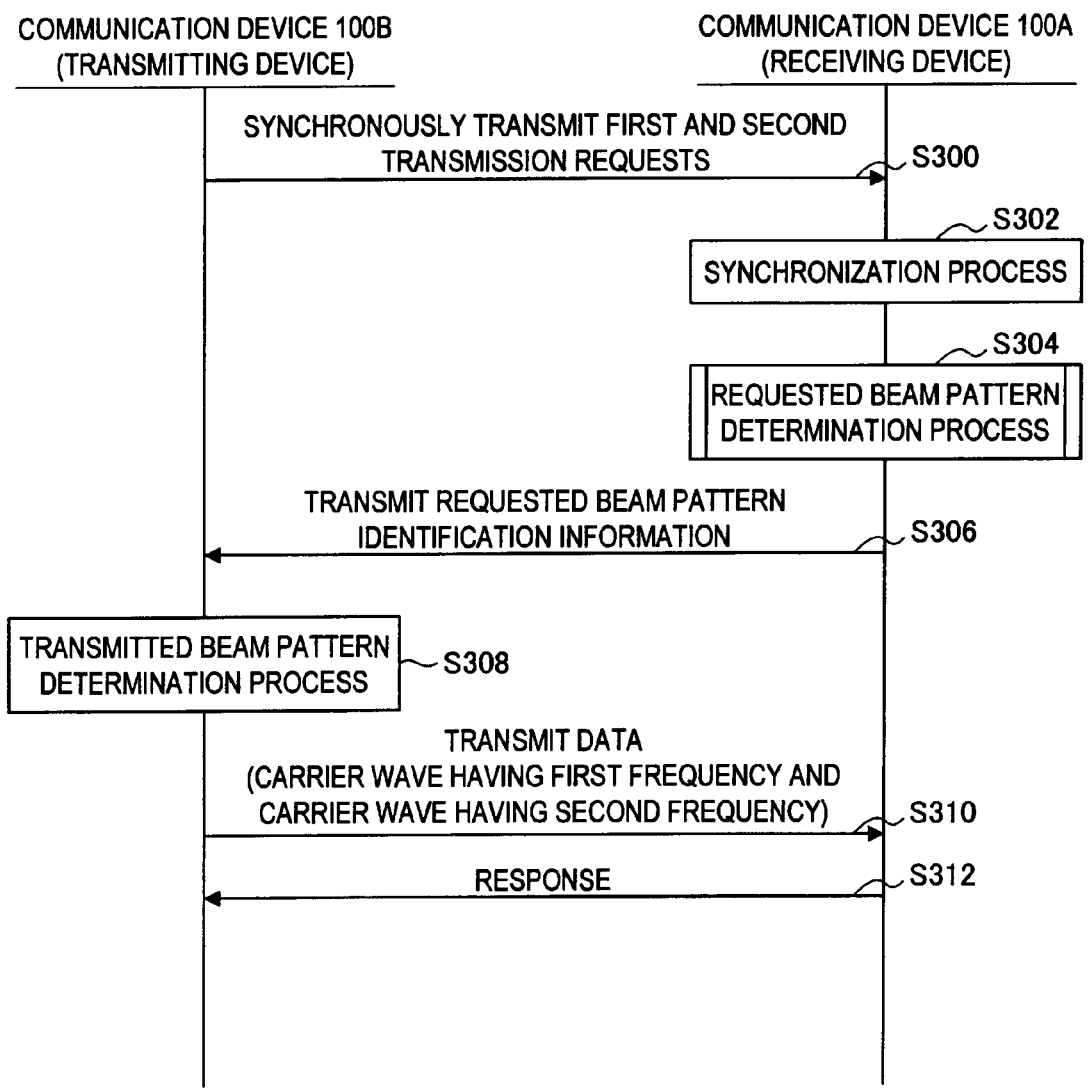
FIG. 6 is an illustration diagram showing an example of the communication process according to the embodiment of the present invention.

Next, the communication process according to the embodiment of the present invention is more specifically described. FIG. 6 is an illustration diagram illustrating an example of the communication process according to the embodiment of the present invention. Herein, FIG. 6 shows an example of the communication process related to the communication between the communication devices 100A and 100B shown in FIG. 1. Further, FIG. 6 shows a case in which the communication device 100A serves as the receiving device and the communication device 100B serves as the transmitting device. Meanwhile, the communication device 100 according to the embodiment of the present invention may serve as the transmitting device and the receiving device. Therefore, the communication device 100A may serve as the transmitting device and the communication device 100B may serve as the receiving device.

The communication device 100B synchronizes the first transmission request with the second transmission request to transmit (S300). Herein, the communication device 100B transmits the second transmission request in which a plurality of transmission beam patterns are set as shown in FIG. 5, for example.

The communication device 100A, which receives the first and second transmission requests transmitted from the communication device 100B at the step S300, specifies the start position of the second transmission request based on the first transmission request (S302; synchronization process). Herein, the communication device 100A realizes the synchronization process by performing the processes at the steps S200 and S202 in FIG. 4, for example.

When the synchronization process is performed at the step S302, the communication device 100A determines the requested beam pattern based on the specified second transmission request (S304; requested beam pattern determination process).

EXAMPLE OF REQUESTED BEAM PATTERN DETERMINATION PROCESS

Figure 7:
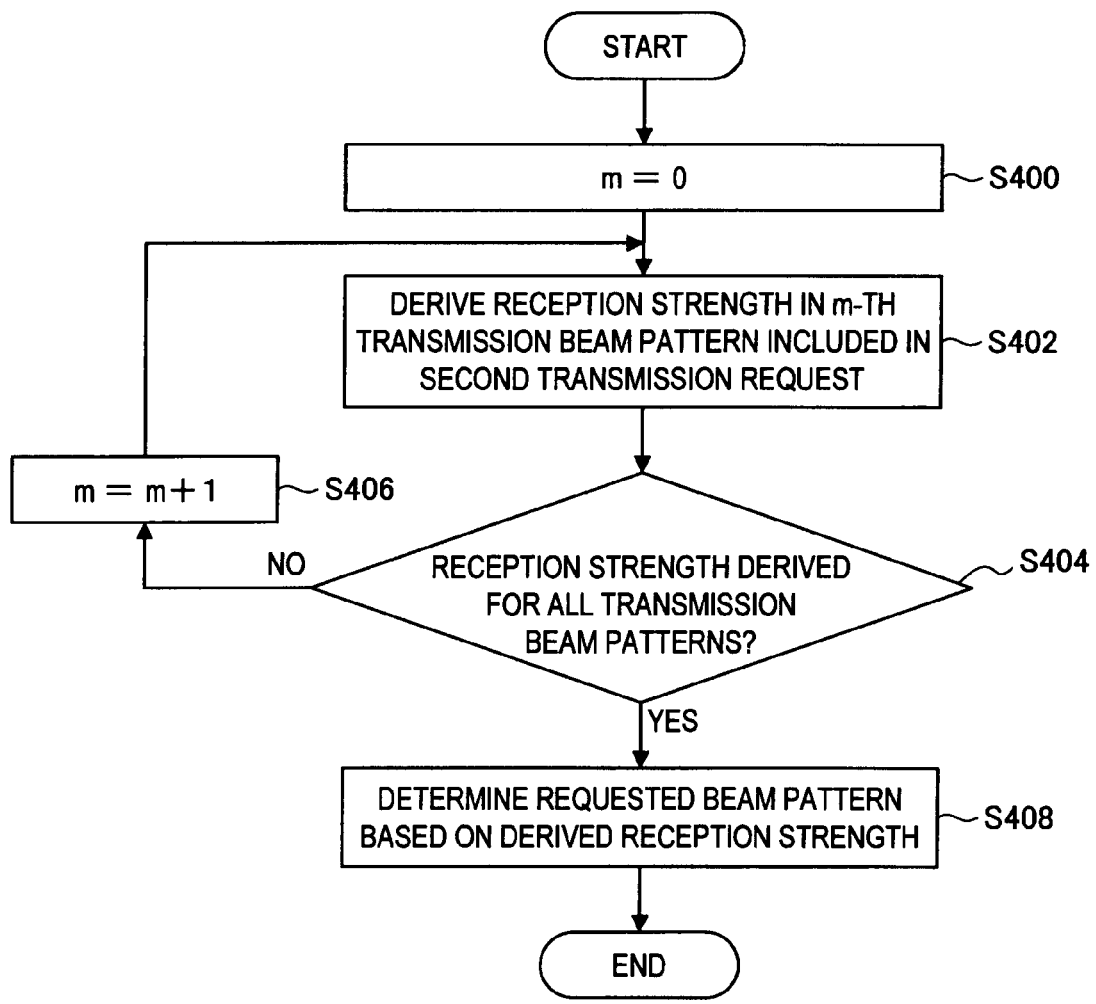
FIG. 7 is a flowchart showing an example of a requested beam pattern determination process in the communication device according to the embodiment of the present invention.

FIG. 7 is a flowchart showing an example of the requested beam pattern determination process in the communication device 100 according to the embodiment of the present invention. Although it is described hereinafter supposing that the communication device 100A performs the requested beam pattern determination process shown in FIG. 7, another communication device 100 may perform the process similarly.

The communication device 100A sets m=0 (S400). Herein, the process at the step S400 corresponds to initialization of the number of processes of the transmission beam patterns set in the second transmission request. Therefore, a value of m set at the step S400 is not limited to m=0.

The communication device 100A derives the reception strength in an m-th transmission beam pattern included in the second communication request (S402). Then, the communication device 100A records the derived reception strength for each transmission beam pattern. Herein, although the communication device 100A derives the received power for each transmission beam pattern based on the received signal as the reception strength, this is not limited to the above description. For example, the communication device 100A may set an absolute value of the received power for each transmission beam pattern based on the received signal as the reception strength.

When the reception strength is derived at the step S402, the communication device 100A judges whether the reception strength is derived for all the transmission beam patterns included in the second communication request (S404).

When it is not judged that the reception strength is derived for all the transmission beam patterns included in the second communication request at the step S404, the communication device 100A updates the value of m to "m=m+1" (S406). Then, the communication device 100A repeats the processes from the step S402.

Further, when it is judged that the reception strength is derived for all the transmission beam patterns included in the second communication request at the step S404, the communication device 100A determines the requested beam pattern based on the derived reception strength (S408). Herein, the communication device 100A determines the transmission beam pattern of which reception strength is the maximum as the requested beam pattern out of the transmission beam patterns included in the second communication request, for example, this is not limited to the above description.

The communication device 100A may determine the requested beam pattern based on a plurality of transmission beam patterns included in the second communication request by performing the process in FIG. 7, for example. Meanwhile, it goes without saying that the requested beam pattern determination process according to the embodiment of the present invention is not limited to the process shown in FIG. 7.

The communication process according to the embodiment of the present invention is described with reference again to FIG. 6. Based on the requested beam pattern determined at the step S304, the communication device 100A transmits the requested beam pattern identification information indicating the requested beam pattern (S306). Herein, the communication device 100A transmits the requested beam pattern identification information by including the same in the signal of the carrier wave f1 having the first frequency (for example, the CTS packet), for example. Further, although there is the number set for a plurality of transmission beam patterns included in the second communication request and the number indicating an order of the transmission beam patterns set in the second communication request, for example, as the requested beam pattern identification information according to the embodiment of the present invention, this is not limited to the above description.

The communication device 100B, which receives the requested beam pattern identification information transmitted from the communication device 100A at the step S306, determines the transmission beam pattern based on the requested beam pattern identification information (S308; transmission beam pattern determination process). Herein, the communication device 100B determines the transmission beam pattern conforming to the requested beam pattern identification information out of a plurality of transmission beam patterns included in the second communication request as the transmission beam pattern used in the transmission of the data, for example.

When the transmission beam pattern is determined at the step S308, the communication device 100B transmits the data (signal) by the carrier wave f2 having the second frequency by applying the determined transmission beam pattern. Further, the communication device 100B may transmit the data (signal) by the carrier wave f1 having the first frequency together with the transmission of the data by the carrier wave f2 having the second frequency.

The communication device 100A, which receives the data (signal) transmitted from the communication device 100B at the step S310 replies to the communication device 100B according to the reception result (S312). Herein, although there is acknowledgement (ACK), for example, as a reply of the communication device 100A at the step S312, this is not limited to the above description.

The communication system 1000 may realize the transmission and reception of the data by the communication by the carrier wave f2 having the second frequency utilizing the directionality of the antenna, by the process (communication process) shown in FIG. 6, for example, performed between the communication devices 100A and 100B.

Herein, the communication device 100B (transmitting device) transmits the data (signal) by the carrier wave f2 having the second frequency by applying the transmission beam pattern of which transmission is requested by the communication device 100A (receiving device) being the communication target. That is to say, the communication device 100A (receiving device) receives the data transmitted from the communication device 100B (transmitting device) by the carrier wave f2 having the second frequency to which the transmission beam pattern of which transmission is requested by the device itself is applied. Therefore, the communication device 100A (receiving device) may receive the data transmitted from the communication device 100B (transmitting device) by the carrier wave f2 having the second frequency more certainly.

Therefore, each of the communication devices 100 composing the communication system 1000 may stabilize the communication in the communication utilizing the directionality of the antenna.

EXAMPLE OF COMMUNICATION IN COMMUNICATION SYSTEM 1000

Figure 8:
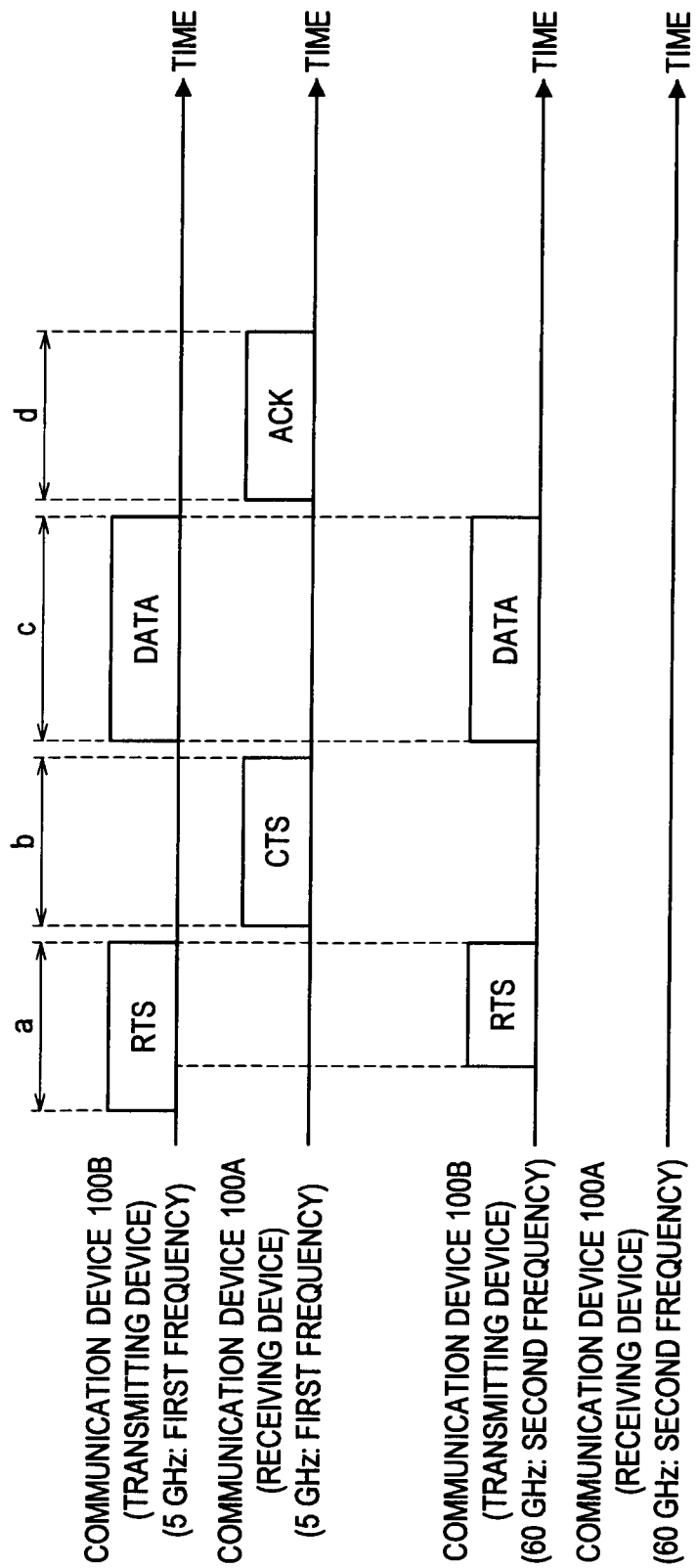
FIG. 8 is an illustration diagram showing an example of communication in a communication system according to the embodiment of the present invention.

Next, an example of the signal transmitted and received between the communication devices 100A and 100B by the communication process shown in FIG. 6, for example, is shown as an example of the communication in the communication system 1000. FIG. 8 is an illustration diagram showing an example of the communication in the communication system 1000 according to the embodiment of the present invention. Herein, FIG. 8 shows an example of the communication between the communication devices 100A and 100B, and shows an example of the communication in a case in which the communication device 100B serves as the transmitting device and the communication device 100A serves as the receiving device as in the case of FIG. 6. Further, in FIG. 8, a case in which the first frequency is 5 GHz and the second frequency is 60 GHz is shown.

The communication device 100B synchronizes the RTS packet of 5 GHz with the RTS packet of 60 GHz to transmit (period a in FIG. 8). Herein, a plurality of transmission beam patterns are set in the RTS packet of 60 GHz as shown in FIG. 5.

The communication device 100A specifies the start position of the RTS packet of 60 GHz based on the received RTS packet of 5 GHz (synchronization process). Further, the communication device 100A determines the requested beam pattern based on the specified RTS packet of 60 GHz (requested beam pattern determination process). Then, the communication device 100A transmits the requested beam pattern identification information indicating the requested beam pattern by the CTS packet of 5 GHz (period b in FIG. 8).

The communication device 100B determines the transmission beam pattern based on the requested beam pattern identification information included in the received CTS packet of 5 GHz (transmission beam pattern determination process). Then, the communication device 100B transmits the DATA by the carrier wave of 60 GHz by applying the determined transmission beam pattern (period c in FIG. 8). Herein, the communication device 100B may transmit the DATA by the carrier wave f1 of 5 GHz together with the transmission of the DATA by the carrier wave f2 of 60 GHz as shown in a period c in FIG. 8.

When the DATA is normally received, the communication device 100A transmits an ACK packet of 5 GHz to notify the communication device 100B of normal reception (period d in FIG. 8).

By the communication shown in FIG. 8, for example, performed between the communication devices 100A and 100B, in the communication system 1000, the communication by the carrier wave f2 of 60 GHz (communication faster than the communication by the carrier wave f1 of 5 GHz) is stably performed. Meanwhile, it goes without saying that the communication between the communication devices 100A and 100B in the communication system 1000 according to the embodiment of the present invention is not limited to the example shown in FIG. 8.

The communication device 100 according to the embodiment of the present invention performs the process (1) (calibration of a plurality of antennas related to the transmission and reception of the carrier wave f2 having the second frequency), process (2) (acquisition process of the transmission beam pattern) and process (3) (communication process).

Herein, the communication device 100 may realize a desired transmission beam pattern by the process (1). Further, the communication device 100 may acquire (store) the candidate of the transmission beam pattern suitable for the communication in a variety of situations by the process (2). Then, the communication device 100 may realize more certain transmission and reception of the data by the carrier wave f2 having the second frequency utilizing the directionality of the antenna by the process (3).

Therefore, the communication device 100 may stabilize the communication in the communication utilizing the directionality of the antenna.

Further, the communication device 100 may realize the desired transmission beam pattern by using the second method (so-called partial calibration) in the process (1). Therefore, this may realize the communication system with a degree of freedom higher than that in a case of using the first method (perfect calibration) when each of the communication devices 100 composing the communication system 1000 uses the second method (partial calibration). Meanwhile, it goes without saying that the communication device 100 may stabilize the communication in the communication utilizing the directionality of the antenna even in a case in which each of the communication devices 100 composing the communication system 1000 uses the first method.

(Communication Device According to Embodiment of the Present Invention)

Next, a configuration of the communication device 100 according to the embodiment of the present invention capable of realizing the communication stabilization approach according to the embodiment of the present invention is described.

Figure 9:
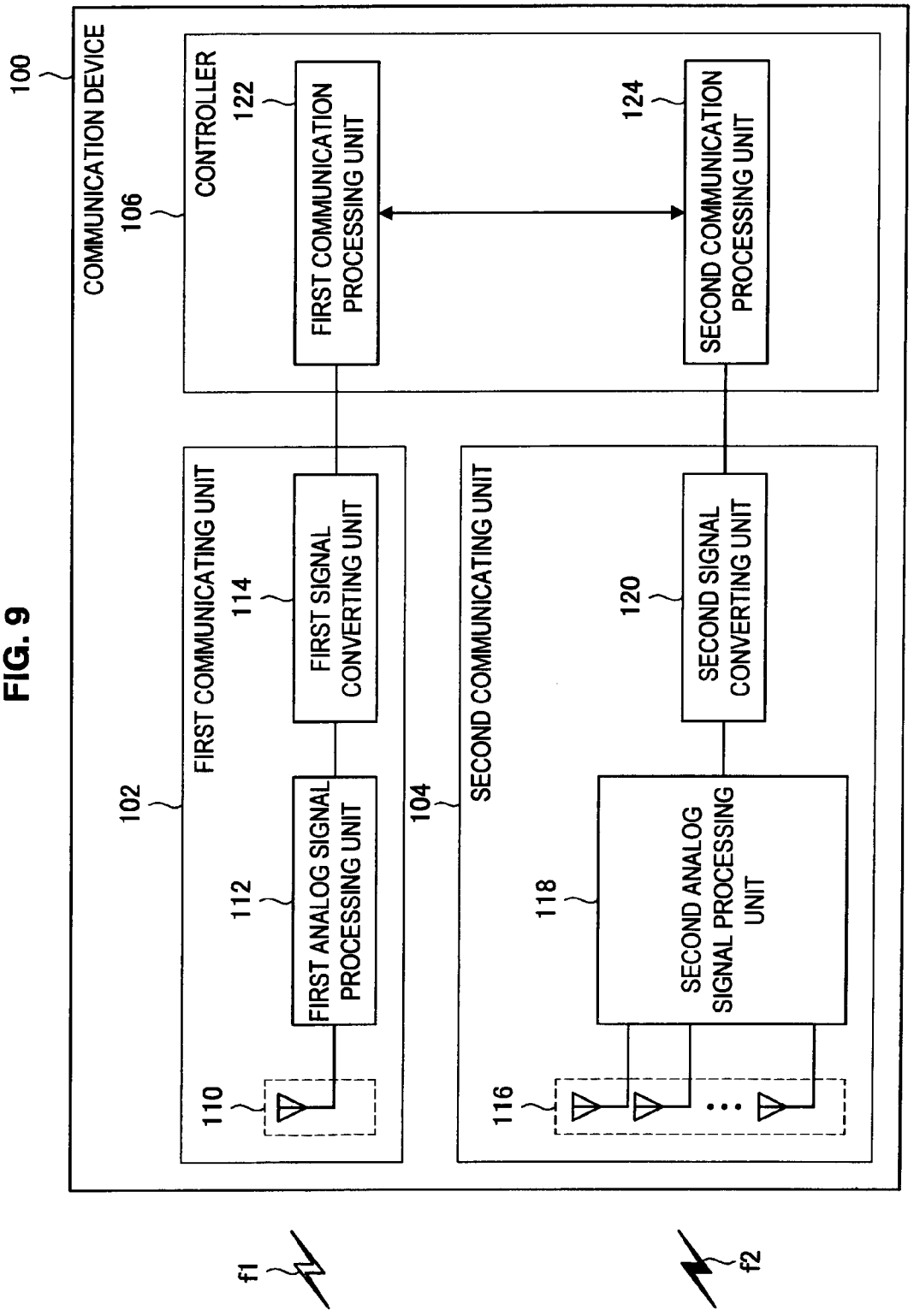
FIG. 9 is an illustration diagram showing an example of a configuration of the communication device according to the embodiment of the present invention.

FIG. 9 is an illustration diagram showing an example of the configuration of the communication device 100 according to the embodiment of the present invention.

The communication device 100 is provided with a first communicating unit 102, a second communicating unit 104 and a controller 106. Further, the communication device 100 may be provided with a read only memory (ROM; not shown), a random access memory (RAM; not shown), a storing unit (not shown), an operating unit (not shown) and a display unit (not shown), for example. The communication device 100 may connect each of the components by a bus as a transmission path of the data, for example.

The storing unit (not shown) is storing means included in the communication device 100 for storing a variety of data such as various data and applications. Herein, although there is a magnetic recording medium such as a hard disk and a nonvolatile memory such as a flash memory, for example, as the storing unit (not shown), this is not limited to the above description.

The operating unit (not shown) is operating means included in the communication device 100, which enables operation by the user. The communication device 100 may perform a process desired by the user by including the operating unit (not shown). Herein, although there is an operation inputting device such as a keyboard and a mouse, a button, a direction key and a rotary selector such as a jog dial or a combination of them, for example, as the operating unit (not shown), this is not limited to the above description.

The display unit (not shown) is display means included in the communication device 100 for displaying a variety of pieces of information on a display screen. As a screen displayed on the display screen of the display unit (not shown), there is an operation screen for allowing the communication device 100 to perform the desired operation, a screen displaying a communication state and the like, for example. Herein, although there is a liquid crystal display (LCD), an organic electroluminescence display (organic EL display, also referred to as an organic light emitting diode display (OLED display)) and the like, for example, as the display unit (not shown), this is not limited to the above description.

The first communicating unit 102 is first communicating means included in the communication device 100 for performing the wireless communication with the external device using the carrier wave f1 having the first frequency. Further, the first communicating unit 102 is provided with a first communication antenna 110, a first analog signal processing unit 112 and a first signal converting unit 114.

The first communication antenna 110 transmits the signal by the carrier wave f1 having the first frequency to one or more external devices, and receives the signal by the carrier wave f1 having the first frequency transmitted from the external device. Hereinafter, there is a case in which the signal transmitted from the first communication antenna 110 is referred to as a "first transmitted signal" and the signal received by the first communication antenna 110 is referred to as a "first received signal".

The first analog signal processing unit 112 processes the first received signal (analog signal) received by the first communication antenna 110 to transfer to the first signal converting unit 114. Further, the first analog signal processing unit 112 processes the signal (analog signal) transferred from the first signal converting unit 114 to allow the first communication antenna 110 to transmit the first transmitted signal. Herein, although there is amplification of each signal and removal of noise and the like, for example, as the process in the first analog signal processing unit 112, this is not limited to the above description. Further, the first analog signal processing unit 112 is composed of an integrated circuit in which various circuits such as an amplifier and a low-pass filter are integrated, for example.

The first signal converting unit 114 converts the signal (analog signal) corresponding to the first received signal transferred from the first analog signal processing unit 112 to a digital signal to transfer to the controller 106 (more specifically, a first communication processing unit 122 to be described later). Further, the first signal converting unit 114 transfers the signal (digital signal) corresponding to the first transmitted signal transferred from the controller 106 (more specifically, the first communication processing unit 122 to be described later) to the first analog signal processing unit 112. Herein, although the first signal converting unit 114 is composed of an analog to digital converter (AD converter) and a digital to analog converter (DA converter), for example, this is not limited to the above description.

The first communicating unit 102 may perform the wireless communication with the external device by using the carrier wave f1 having the first frequency by including the first communication antenna 110, the first analog signal processing unit 112 and a first signal converting unit 114.

The second communicating unit 104 is second communicating means included in the communication device 100 for performing the wireless communication with the external device by using the carrier wave f2 having the second frequency. Further, the second communicating unit 104 is provided with a second communication antenna 116, a second analog signal processing unit 118 and a second signal converting unit 120.

The second communication antenna 116 is provided with a plurality of communication antennas for transmitting the signal by the carrier wave f2 having the second frequency to one or more external devices and receiving the signal by the carrier wave f2 having the second frequency transmitted from the external device. Hereinafter, there is a case in which the signal transmitted from the second communication antenna 116 is referred to as a "second transmitted signal" and the signal received by the second communication antenna 116 is referred to as a "second received signal".

The second analog signal processing unit 118 processes the second received signal (analog signal) received by each of the communication antennas composing the second communication antenna 116 to transfer to the second signal converting unit 120. Further, the second analog signal processing unit 118 processes the signal (analog signal) transferred from the second signal converting unit 120 to allow each communication antenna composing the second communication antenna 116 to transmit the second transmitted signal. Herein, although there is the amplification of each signal, the removal of the noise and the like, for example, as the process in the second analog signal processing unit 118, this is not limited to the above description. Further, the second analog signal processing unit 118 is composed of the integrated circuit in which the various circuits such as the amplifier and the low-pass filter are integrated, for example, as in the case of the first analog signal processing unit 112.

The second signal converting unit 120 converts the signal (analog signal) corresponding to the second received signal transferred from the second analog signal processing unit 118 to the digital signal to transfer to the controller 106 (more specifically, a second communication processing unit 124 to be described later). Further, the second signal converting unit 120 transfers the signal (digital signal) corresponding to the second transmitted signal transferred from the controller 106 (more specifically, the second communication processing unit 124 to be described later) to the second analog signal processing unit 118. Herein, although the second signal converting unit 120 is composed of the AD converter and the DA converter, for example, as in the case of the first signal converting unit 114, this is not limited to the above description.

The second communicating unit 104 may perform the wireless communication with the external device by using the carrier wave f2 having the second frequency by including the second communication antenna 116, the second analog signal processing unit 118 and the second signal converting unit 120.

The controller 106 is composed of a micro processing unit (MPU), the integrated circuit in which the various processing circuits are integrated and the like, for example, and controls an entire communication device 100. Further, the controller 106 is provided with the first communication processing unit 122 and the second communication processing unit 124, and serves to initiatively perform the above-described process (1) (calibration of a plurality of antennas related to the transmission and reception of the carrier wave f2 having the second frequency) to process (3) (communication process).

The first communication processing unit 122 processes the first received signal transferred from the first communicating unit 102 and allows the first communicating unit 102 to transmit the first transmitted signal. Herein, the first communication processing unit 122 may perform the process through cooperation with the second communication processing unit 124, such as allowing the first communicating unit 102 to transmit the first transmitted signal (for example, a third transmission request to be described later) according to a transmission instruction from the second communication processing unit 124.

EXAMPLE OF PROCESS OF FIRST RECEIVED SIGNAL IN FIRST COMMUNICATION PROCESSING UNIT 122

Herein, an example of the process of the first received signal in the first communication processing unit 122 is described. The first communication processing unit 122 generates the packet positional information indicating the position of the predetermined packet based on the first transmission request (an example of the first received signal) transferred from the first communicating unit 102, for example, and transfers the generated packet positional information to the second communication processing unit 124.

Herein, the packet positional information is a trigger for starting the synchronization process in the second communication processing unit 124. Although there is a pulse signal indicating that the position of the predetermined packet of the first transmission request is detected, for example, as the packet positional information, this is not limited to the above description. For example, the packet positional information according to the embodiment of the present invention may be an optional signal and data capable of serving as the trigger of the synchronization process.

Further, when the requested beam pattern identification information is transferred from the first communicating unit 102 to the first communication processing unit 122, this transfers the requested beam pattern identification information to the second communication processing unit 124.

The first communication processing unit 122 performs the above-described process, for example, as the process of the first received signal, for example. Meanwhile, the process of the first received signal in the first communication processing unit 122 is not limited to the above description.

The second communication processing unit 124 processes the second received signal transferred from the second communicating unit 104 and allows the second communicating unit 104 to transmit the second transmitted signal. Herein, the second communication processing unit 124 may perform the process through cooperation with the first communication processing unit 122 such as performing the process based on the packet positional information and the requested beam pattern identification information transferred from the first communication processing unit 122.

CONFIGURATION EXAMPLE OF SECOND COMMUNICATION PROCESSING UNIT 124

Figure 10:
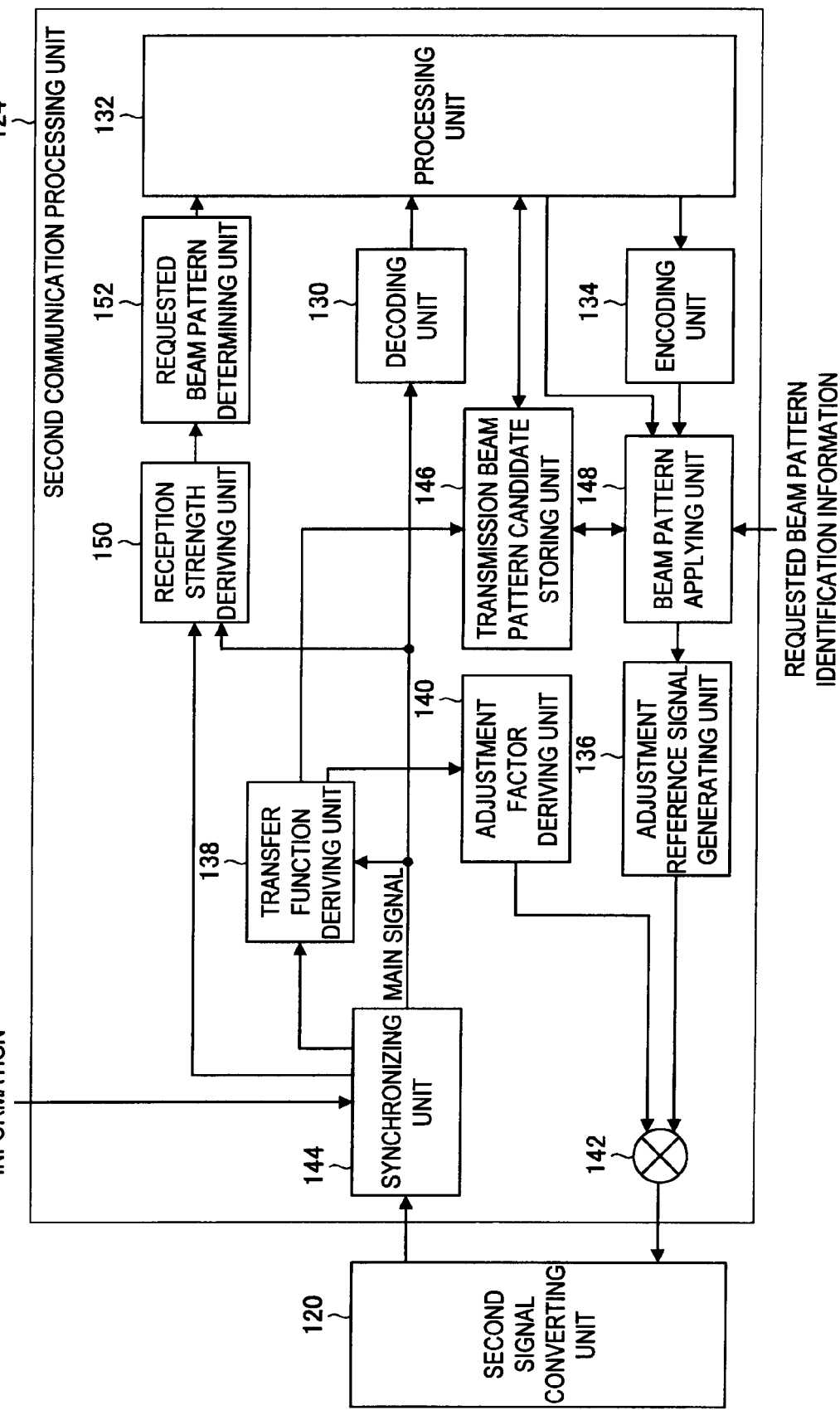
FIG. 10 is an illustration diagram showing an example of a configuration of a second communication processing unit according to the embodiment of the present invention.

Herein, a configuration of the second communication processing unit 124 is more specifically described. FIG. 10 is an illustration diagram showing an example of the configuration of the second communication processing unit 124 according to an embodiment of the present invention. FIG. 10 also shows the second signal converting unit 120 composing the second communicating unit 104.

The second communication processing unit 124 is provided with a decoding unit 130, a processing unit 132, an encoding unit 134, an adjustment reference signal generating unit 136, a transfer function deriving unit 138, an adjustment factor deriving unit 140, a multiplying unit 142, a synchronizing unit 144, a transmission beam pattern candidate storing unit 146, a beam pattern applying unit 148, a reception strength deriving unit 150 and a requested beam pattern determining unit 152.

Herein, the adjustment reference signal generating unit 136, the transfer function deriving unit 138, the adjustment factor deriving unit 140 and the multiplying unit 142 serve as an adjusting unit for performing the process (1) (calibration of a plurality of antennas related to the transmission and reception of the carrier wave f2 having the second frequency) in the second communication processing unit 124.

Further, the synchronizing unit 144, the transfer function deriving unit 138 and the transmission beam pattern candidate storing unit 146 serve as a transmission beam pattern candidate setting unit for performing the process (2) (acquisition process of the transmission beam pattern) in the second communication processing unit 124.

Further, the reception strength deriving unit 150, the requested beam pattern determining unit 152 and the processing unit 132 serve to perform the requested beam pattern determination process out of the process (3) (communication process) in the second communication processing unit 124.

The decoding unit 130 performs demodulation and demapping, for example, based on the digital signal as the second received signal transferred from the second communicating unit 104.

The processing unit 132 serves to perform a variety of signal processes in the second communication processing unit 124.

EXAMPLE OF SIGNAL PROCESS IN PROCESSING UNIT 132

Herein, an example of the signal process in the processing unit 132 is described. The processing unit 132 processes the signal transferred from the decoding unit 130 and transfers the signal according to the process result to the encoding unit 134.

Further, the processing unit 132 performs the process to allow the second communicating unit 104 to transmit the transmission request (third transmission request) in which one or more transmission beam pattern candidates are set in one packet based on the transmission beam pattern candidate stored in the transmission beam pattern candidate storing unit 146. The process in the processing unit 132 is performed when the communication device 100 serves as the transmitting device, for example. Although there is the RTS packet of 60 GHz shown in FIG. 5, for example, as the third transmission request, this is not limited to the above description. Herein, the third transmission request corresponds to the second transmission request in another communication device 100 composing the communication system 1000. Further, the processing unit 132 may allow the RTS packet of 60 GHz shown in FIG. 5, for example, to be transmitted from the second communicating unit 104 by controlling the beam pattern applying unit 148 to be described later.

Further, the processing unit 132 generates the requested beam pattern identification information (second requested beam pattern identification information) corresponding to the requested beam pattern determined by the requested beam pattern determining unit 152, for example. Then, the processing unit 132 allows the generated requested beam pattern identification information to be transmitted to the external device, which transmits the second transmission request, through the first communication processing unit 122. The process in the processing unit 132 is performed when the communication device 100 serves as the receiving device, for example.

Herein, although there is the number indicating the beam pattern determined by the requested beam pattern determining unit 152, for example, as the second requested beam pattern identification information generated by the processing unit 132, this is not limited to the above description. Further, the external device, which transmits the second transmission request with which the processing unit 132 allows the requested beam pattern identification information to be transmitted, corresponds to the external device, which transmits the second transmission request used when the requested beam pattern determining unit 152 determines the requested beam pattern. Further, the second requested beam pattern identification information corresponds to the first requested beam pattern identification information (to be described later) in another communication device 100 composing the communication system 1000.

Meanwhile, although the configuration in which the second communication processing unit 124 is provided with the requested beam pattern determining unit 152 and the processing unit 132 separately is shown in FIG. 10, this is not limited to the above description. For example, in the second communication processing unit 124 according to the embodiment of the present invention, the processing unit 132 may serve as the requested beam pattern determining unit 152 to be described later.

Further, the processing unit 132 may allow the RTS packet (second transmission request) shown in FIG. 3, for example, to be transmitted from the second communicating unit 104 by controlling the beam pattern applying unit 148, for example, this is not limited to the above description. For example, the second communication processing unit 124 may further be provided with a component (not shown), which serves to generate the RTS packet (second transmission request) shown in FIG. 3.

The processing unit 132 performs the process as described above, for example, as the signal process, for example. Meanwhile, the signal process in the processing unit 132 is not limited to the above description.

The encoding unit 134 performs modulation and mapping, for example, based on the signal transferred from the processing unit 132.

The adjustment reference signal generating unit 136 inserts the adjustment reference signal (known signal) related to the process (1) to the signal transmitted from the second communicating unit 104. Herein, insertion of the adjustment reference signal to the signal transmitted from the second communicating unit 104 may be treated as generation of the adjustment reference signal. Further, although the adjustment reference signal generating unit 136 generates the adjustment reference signal based on the data recorded in the ROM and the like, for example, this is not limited to the above description.

The transfer function deriving unit 138 derives the loop back transfer function based on the adjustment reference signal included in the second received signal transferred from the second communicating unit 104. Herein, although the transfer function deriving unit 138 selectively derives the loop back transfer function when the adjustment reference signal generating unit 136 generates the adjustment reference signal through cooperation with the adjustment reference signal generating unit 136, for example, this is not limited to the above description. Further, the transfer function deriving unit 138 transfers the derived loop back transfer function to the adjustment factor deriving unit 140 when deriving the loop back transfer function.

Further, the transfer function deriving unit 138 derives the transfer function corresponding to the external device, which transmits the second transmission request, based on the signal indicating that the second transmission request transferred from the synchronizing unit 144 is received. Herein, the transfer function deriving unit 138 transfers the derived transfer function to the transmission beam pattern candidate storing unit 146 when deriving the transfer function.

The adjustment factor deriving unit 140 derives the adjustment factor K(i) based on the loop back transfer function transferred from the transfer function deriving unit 138. Further, the adjustment factor deriving unit 140 stores the derived adjustment factor K(i), for example, and transfers the stored adjustment factor K(i) to the multiplying unit 142.

Herein, although transfer of the adjustment factor K(i) to the multiplying unit 142 in the adjustment factor deriving unit 140 is controlled by the processing unit 132, for example, this is not limited to the above description. Further, the adjustment factor deriving unit 140 records in the nonvolatile memory such as an electrically erasable and programmable read only memory (EEPROM) and the flash memory. Then, the adjustment factor deriving unit 140 appropriately reads the adjustment factor K(i) from the nonvolatile memory to transfer to the multiplying unit 142.

The multiplying unit 142 is composed of a multiplier, for example, and multiplies the adjustment factor K(i) by the signal transmitted from the second communicating unit 104.

The synchronizing unit 144 specifies the start position of the second transmission request based on the packet positional information transferred from the first communication processing unit 122. Further, the synchronizing unit 144 transfers the signal indicating that the second transmission request is received to the transfer function deriving unit 138 and/or the reception strength deriving unit 150.

Further, when the second communicating unit 104 receives the DATA shown in FIG. 8, although the synchronizing unit 144 synchronizes with the process of the first communication processing unit 122 by bit synchronization, character synchronization and the like, for example, this is not limited to the above description.

The transmission beam pattern candidate storing unit 146 derives the transmission beam pattern candidate based on the transfer function D(i) transferred from the transfer function deriving unit 138, and stores the derived transmission beam pattern. Further, the transmission beam pattern candidate storing unit 146 associates the transmission beam pattern candidate with the identification number (for example, the index number) for identifying the transmission beam pattern candidate to store the transmission beam pattern candidate, for example. Herein, although the transmission beam pattern candidate storing unit 146 stores the transmission beam pattern candidate and the identification number in the nonvolatile memory such as the EEPROM and the flash memory, for example, this is not limited to the above description. Further, the storage of the transmission beam pattern candidate in the transmission beam pattern candidate storing unit 146 corresponds to setting of the transmission beam pattern candidate in the communication device 100.

The beam pattern applying unit 148 weights the signal selectively transmitted from the second communicating unit 104 to set the directionality (or non-directionality) to the signal transmitted from the second communicating unit 104. Herein, the beam pattern applying unit 148 is controlled by the processing unit 132, for example, and sets the directionality (or the non-directionality) by multiplying (applying) the transmission beam pattern candidate stored in the transmission beam pattern candidate storing unit 146 by the selectively transmitted signal.

Further, the beam pattern applying unit 148 serves to perform the transmission beam pattern determination process out of the process (3) (communication process). More specifically, the beam pattern applying unit 148 multiplies (applies) the transmission beam pattern candidate corresponding to the requested beam pattern identification information by the transmitted signal based on the requested beam pattern identification information (first requested beam pattern identification information) transmitted from the external device. Herein, the requested beam pattern identification information transferred to the beam pattern applying unit 148 is transferred from the first communication processing unit 122 based on the CTS packet having the first frequency shown in FIG. 8 received by the first communicating unit 102, for example.

By including the beam pattern applying unit 148, the communication device 100 may allow the second transmitted signal to which the transmission beam pattern of which transmission is requested by the external device is applied to be transmitted from the second communicating unit 104.

The reception strength deriving unit 150 derives the reception strength based on the second transmission request transferred from the second communicating unit 104. Further, although the reception strength deriving unit 150 selectively derives the reception strength based on the signal indicating that the second transmission request transferred from the synchronizing unit 144 is received, for example, this is not limited to the above description.

The requested beam pattern determining unit 152 determines the requested beam pattern based on a derivation result in the reception strength deriving unit 150.

The second communication processing unit 124 processes the second received signal transferred from the second communicating unit 104 by including the configuration shown in FIG. 10, for example, and allows the second communicating unit 104 to transmit the second transmitted signal. Further, the second communication processing unit 124 performs the processes (1) to (3) through cooperation with the first communication processing unit 122 by including the configuration shown in FIG. 10, for example. Meanwhile, it goes without saying that the configuration of the second communication processing unit 124 according to the embodiment of the present invention is not limited to the configuration shown in FIG. 10.

The controller 106 may realize the above-described process (1) (calibration of a plurality of antennas related to the transmission and reception of the carrier wave f2 having the second frequency) to process (3) (communication process) by including the first and second communication processing units 122 and 124.

The communication device 100 may realize the communication stabilization approach according to the above-described embodiment of the present invention by the configuration shown in FIG. 9, for example.

As described above, the communication device 100 composing the communication system 1000 according to the embodiment of the present invention performs the above-described processes (1) (calibration of a plurality of antennas related to the transmission and reception of the carrier wave f2 having the second frequency), (2) (acquisition process of the transmission beam pattern) and (3) (communication process). Herein, the communication device 100 is capable of realizing the desired transmission beam pattern by the process (1).

Further, the communication device 100 may acquire (store) the candidate of the transmission beam pattern suitable for the communication in a variety of situations by the process (2). Then, the communication device 100 may realize more certain transmission and reception of the data by the carrier wave f2 having the second frequency utilizing the directionality of the antenna by the process (3). Therefore, the communication device 100 may stabilize the communication in the communication utilizing the directionality of the antenna.

Further, although the communication device 100 is described as an example of the embodiment of the present invention, the embodiment of the present invention is not limited to such a form. The embodiment of the present invention may be applied to a variety of devices having a communication function such as a computer such as a PC, the television receiver, a portable communication device such as a cell phone, and a portable game device such as the PlayStation Portable (registered trade mark).

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-036295 filed in the Japan Patent Office on Feb. 19, 2009, the entire content of which is hereby incorporated by reference.

What is claimed is:

1. A communication device comprising:
   a first communicating unit that performs wireless communication with an external device on a first carrier wave at a first frequency;
   a second communicating unit that has a plurality of antennas, and that performs the wireless communication with the external device on a second carrier wave at a second frequency, wherein a directionality of the second carrier wave is stronger than a directionality of the first carrier, and wherein the second carrier wave causes a larger propagation loss than the first carrier wave causes;
   a first communication processing unit that processes a signal received by the first communicating unit, and that allows the first communicating unit to transmit a signal; and
   a second communication processing unit that processes a signal received by the second communicating unit, and that allows the second communicating unit to transmit a signal,
   wherein the second communication processing unit includes
   an adjusting unit that adjusts a signal to be transmitted from each of the plurality of antennas based on an adjustment factor for the each of the plurality of antennas, the adjustment factor derived by a loop back transfer function among the plurality of antennas,
   a transmission beam pattern candidate setting unit that derives at least one transmission beam pattern for defining a beam directionality of the signal to be transmitted based on a first transmission request received by the first communicating unit and a second transmission request received by the second communicating unit, and that sets the derived at least one transmission beam pattern as at least one transmission beam pattern candidate to be applied to the signal to be transmitted, and
   a beam pattern applying unit that applies any of the set at least one transmission beam pattern candidate based on first requested-beam-pattern identification information transferred from the first communication processing unit, the first requested-beam-pattern identification information specifying a beam pattern of which transmission is requested by the external device.

2. The communication device according to claim 1,
wherein the transmission beam pattern candidate setting unit includes
a synchronizing unit that locates a starting position of the second transmission request based on packet positional information transferred from the first communication processing unit, the packet positional information indicating a position of a predetermined packet included in the first transmission request,
a transfer function deriving unit that derives a transfer function based on the second transmission request whose starting position is located by the synchronizing unit, and
a transmission beam pattern candidate storing unit that derives the transmission beam pattern based on the transfer function derived by the transfer function deriving unit, and in which the derived transmission beam pattern is stored as the transmission beam pattern candidate.

3. The communication device according to claim 2,
wherein the second communicating unit receives the second transmission request, one packet of which nominates a plurality of transmission beam patterns, and
wherein the second communication processing unit further includes
a reception strength deriving unit that derives a reception strength for each of the nominated plurality of transmission beam patterns based on the second transmission request whose starting position is located by the synchronizing unit,
a requested-beam-pattern determining unit that determines, out of the plurality of transmission beam patterns nominated in the packet of the second transmission request, a beam pattern to request the external device to transmit data in, based on a derivation result from the reception strength deriving unit, the second transmission request having been transmitted from the external device, and
a processing unit that allows, via the first communication processing unit, second requested-beam-pattern identification information to be transmitted to the external device, which transmits the second transmission request, the second requested-beam-pattern identification information indicating the beam pattern determined by the requested-beam-pattern determining unit.

4. The communication device according to claim 3,
wherein the second requested-beam-pattern identification information is a number indicating the beam pattern determined by the requested-beam-pattern determining unit.

5. The communication device according to claim 2,
wherein the second communication processing unit further includes a processing unit that allows the second communicating unit to transmit a third transmission request, one packet of which nominates one or more transmission beam pattern candidates stored in the transmission beam pattern candidate storing unit.

6. The communication device according to claim 1,
wherein the adjusting unit includes
an adjustment reference signal generating unit that generates an adjustment reference signal for a reference for deriving the loop back transfer function, a transfer function deriving unit that derives the loop back transfer function for each of the plurality of antennas based on a reception result acquired by transmitting the adjustment reference signal from the each of the plurality of antennas and receiving the transmitted adjustment reference signal at another of the plurality of antennas, an adjustment factor deriving unit that derives the adjustment factor based on the loop back transfer function derived by the transfer function deriving unit, and a multiplying unit that multiplies the signal to be transmitted by the adjustment factor.

7. A communication method comprising the steps of:

transmitting, at a transmitting device, synchronously a first transmission request using a first carrier wave at a first frequency and a second transmission request using a second carrier wave at a second frequency, one packet of the second transmission request nominating a plurality of transmission beam patterns for defining a beam directionality of the signal to be transmitted, wherein a directionality of the second carrier wave is stronger than a directionality of the first carrier, and wherein the second carrier wave causes a larger propagation loss than the first carrier wave causes;

locating, by a receiving device, a starting position of the second transmission request, based on a position of a predetermined packet included in the first transmission request;

determining, at the receiving device, out of the plurality of transmission beam patterns nominated in the packet of the second transmission request, a beam pattern to request the transmitting device to transmit a data in;

transmitting, at the receiving device, requested-beam-pattern identification information indicating the determined beam pattern to request;

determining, at the transmitting device, a beam pattern for use in transmitting the data on the second carrier wave, based on the requested-beam-pattern identification information; and transmitting, at the transmitting device, the data on the second carrier wave, to which the determined beam pattern for use in transmitting the data is applied.

8. A communication system comprising:

a plurality of communication devices, each of which is capable of transmitting a signal and receiving a signal transmitted from an external device, wherein each of the communication devices includes a first communicating unit that performs wireless communication with an external device on a first carrier wave at a first frequency, a second communicating unit that has a plurality of antennas, and that performs the wireless communication with the external device on a second carrier wave at a second frequency, wherein a directionality of the second carrier wave is stronger than a directionality of the first carrier, and wherein the second carrier wave causes a larger propagation loss than the first carrier wave causes, a first communication processing unit that processes a signal received by the first communicating unit, and that allows the first communicating unit to transmit a signal, and a second communication processing unit that processes a signal received by the second communicating unit, and that allows the second communicating unit to transmit a signal, and wherein the second communication processing unit includes an adjusting unit that adjusts a signal to be transmitted from each of the plurality of antennas based on an adjustment factor for the each of the plurality of antennas, the adjustment factor derived by a loop back transfer function among the plurality of antennas, a transmission beam pattern candidate setting unit that derives at least one transmission beam pattern for defining a beam directionality of the signal to be transmitted based on a first transmission request received by the first communicating unit and a second transmission request received by the second communicating unit, and that sets the derived at least one transmission beam pattern as at least one transmission beam pattern candidate to be applied to the signal to be transmitted, and a beam pattern applying unit that applies any of the set at least one transmission beam pattern candidate based on first requested-beam-pattern identification information transferred from the first communication processing unit, the first requested-beam-pattern identification information specifying a beam pattern of which transmission is requested by the external device.

* * * * *